US009244195B2

(12) United States Patent
Bauman et al.

(10) Patent No.: US 9,244,195 B2
(45) Date of Patent: Jan. 26, 2016

(54) SILICONE HYDROGEL LENSES WITH NANO-TEXTURED SURFACES

(75) Inventors: R. Erich Bauman, Duluth, GA (US); Peter Hagmann, Erlenbach am Main (DE); John Dallas Pruitt, Suwanee, GA (US); Joseph Michael Rappon, Alpharetta, GA (US)

(73) Assignee: Novartis AG, Basel (CH)

( * ) Notice: Subject to any disclaimer, the term of this patent is extended or adjusted under 35 U.S.C. 154(b) by 851 days.

(21) Appl. No.: 13/490,517

(22) Filed: Jun. 7, 2012

(65) Prior Publication Data

US 2012/0314185 A1 Dec. 13, 2012

Related U.S. Application Data

(60) Provisional application No. 61/494,914, filed on Jun. 9, 2011.

(51) Int. Cl.
*B29D 11/00* (2006.01)
*G02B 1/04* (2006.01)

(52) U.S. Cl.
CPC .......... *G02B 1/043* (2013.01); *B29D 11/00346* (2013.01)

(58) Field of Classification Search
IPC ............................. B29D 11/00346; G02B 1/043
See application file for complete search history.

(56) References Cited

U.S. PATENT DOCUMENTS

| 3,408,429 | A | 10/1968 | Wichterle |
| 4,042,552 | A | 8/1977 | Grucza |
| 4,045,547 | A | 8/1977 | Le Boeuf |
| 4,136,250 | A | 1/1979 | Mueller |
| 4,153,641 | A | 5/1979 | Deichert |
| 4,182,822 | A | 1/1980 | Chang |
| 4,189,546 | A | 2/1980 | Deichert |
| 4,254,248 | A | 3/1981 | Friends |
| 4,259,467 | A | 3/1981 | Keogh |
| 4,260,725 | A | 4/1981 | Keogh |
| 4,261,875 | A | 4/1981 | LeBoeuf |
| 4,276,402 | A | 6/1981 | Chromecek |
| 4,327,203 | A | 4/1982 | Deichert |
| 4,341,889 | A | 7/1982 | Deichert |

(Continued)

FOREIGN PATENT DOCUMENTS

| EP | 1465931 B1 | 8/2007 |
| WO | 0157118 A2 | 8/2001 |

OTHER PUBLICATIONS

PCT International Search Report dated Aug. 23, 2012, International Application No. PCT/US2012/041207, International Filing Date Jun. 7, 2012.

(Continued)

*Primary Examiner* — Mathieu Vargot
(74) *Attorney, Agent, or Firm* — Jian Zhou

(57) ABSTRACT

The invention is related to a method for making a silicone hydrogel contact lens having a nano-textured surface which mimics the surface texture of cornea of human eye. A method of the invention comprises creating a prime coating having nano-textures through controlled imbibition and/or depositions of a reactive polymeric coating material and fixing the nano-textures by crosslinking a hydrophilic polymeric material onto the prime coating to form a crosslinked polymeric coating that perserves the nano-textures of the prime coating and provides a nano-textured surface to the contact lens.

16 Claims, 3 Drawing Sheets

(56) References Cited

U.S. PATENT DOCUMENTS

| | | | |
|---|---|---|---|
| 4,343,927 A | 8/1982 | Chang |
| 4,347,198 A | 8/1982 | Ohkada |
| 4,355,147 A | 10/1982 | Deichert |
| 4,444,711 A | 4/1984 | Schad |
| 4,460,534 A | 7/1984 | Boehm |
| 4,486,577 A | 12/1984 | Mueller |
| 4,543,398 A | 9/1985 | Bany |
| 4,605,712 A | 8/1986 | Mueller |
| 4,661,575 A | 4/1987 | Tom |
| 4,684,538 A | 8/1987 | Klemarczyk |
| 4,703,097 A | 10/1987 | Wingler |
| 4,833,218 A | 5/1989 | Lee |
| 4,837,289 A | 6/1989 | Mueller |
| 4,954,586 A | 9/1990 | Toyoshima |
| 4,954,587 A | 9/1990 | Mueller |
| 5,010,141 A | 4/1991 | Mueller |
| 5,034,461 A | 7/1991 | Lai |
| 5,039,761 A | 8/1991 | Ono |
| 5,070,170 A | 12/1991 | Robertson |
| 5,079,319 A | 1/1992 | Mueller |
| 5,198,477 A | 3/1993 | von der Haegen |
| 5,219,965 A | 6/1993 | Valint, Jr. |
| 5,346,946 A | 9/1994 | Yokoyama |
| 5,358,995 A | 10/1994 | Lai |
| 5,387,632 A | 2/1995 | Lai |
| 5,416,132 A | 5/1995 | Yokoyama |
| 5,451,617 A | 9/1995 | Lai |
| 5,486,579 A | 1/1996 | Lai |
| 5,508,317 A | 4/1996 | Müller |
| 5,527,925 A | 6/1996 | Chabrecek |
| 5,583,163 A | 12/1996 | Müller |
| 5,612,389 A | 3/1997 | Chabrecek |
| 5,612,391 A | 3/1997 | Chabrecek |
| 5,621,018 A | 4/1997 | Chabrecek |
| 5,760,100 A | 6/1998 | Nicolson |
| 5,789,464 A | 8/1998 | Müller |
| 5,843,346 A | 12/1998 | Morrill |
| 5,849,810 A | 12/1998 | Müller |
| 5,849,811 A | 12/1998 | Nicolson |
| 5,894,002 A | 4/1999 | Boneberger |
| 5,962,548 A | 10/1999 | Vanderlaan |
| 5,981,675 A | 11/1999 | Valint, Jr. |
| 6,039,913 A | 3/2000 | Hirt |
| 6,218,508 B1 | 4/2001 | Kragh |
| 6,367,929 B1 | 4/2002 | Maiden |
| 6,627,124 B1 | 9/2003 | Herbrechtsmeier |
| 6,762,264 B2 | 7/2004 | Künzler |
| 6,779,888 B2 | 8/2004 | Marmo |
| 6,800,225 B1 | 10/2004 | Hagmann |
| 6,822,016 B2 | 11/2004 | McCabe |
| 6,886,936 B2 | 5/2005 | Marmo |
| 7,080,905 B2 | 7/2006 | Marmo |
| 7,091,283 B2 | 8/2006 | Müller |
| 7,238,750 B2 | 7/2007 | Müller |
| 7,249,849 B2 | 7/2007 | Marmo |
| 7,268,189 B2 | 9/2007 | Müller |
| 7,279,507 B2 | 10/2007 | Hu |
| 7,384,590 B2 | 6/2008 | Kelly |
| 7,387,759 B2 | 6/2008 | Kelly |
| 7,521,519 B1 | 4/2009 | Hirt |
| 7,625,598 B2 | 12/2009 | Sharma |
| 2002/0086160 A1 | 7/2002 | Qiu |
| 2003/0143335 A1 | 7/2003 | Qiu |
| 2006/0079598 A1 | 4/2006 | Winterton |
| 2006/0251696 A1 | 11/2006 | Winterton |
| 2007/0222095 A1* | 9/2007 | Zanini et al. ............ 264/1.32 |
| 2008/0015315 A1 | 1/2008 | Chang |
| 2008/0124376 A1 | 5/2008 | Pruitt |
| 2008/0143003 A1 | 6/2008 | Phelan |
| 2008/0143958 A1 | 6/2008 | Medina |
| 2008/0231798 A1 | 9/2008 | Zhou |
| 2008/0234457 A1 | 9/2008 | Zhou |
| 2008/0248263 A1 | 10/2008 | Kobrin |
| 2009/0032988 A1 | 2/2009 | Zanini |
| 2009/0061152 A1 | 3/2009 | DeSimone |
| 2009/0303432 A1 | 12/2009 | Suzuki |
| 2010/0039613 A1 | 2/2010 | Sharma |
| 2010/0140114 A1 | 6/2010 | Pruitt |
| 2010/0296049 A1 | 11/2010 | Justynska |
| 2010/0298446 A1 | 11/2010 | Chang |
| 2011/0085128 A1 | 4/2011 | Liu |
| 2011/0273663 A1 | 11/2011 | Pugh |

OTHER PUBLICATIONS

PCT Written Opinion of the International Searching Authority dated Aug. 23, 2012, International Application No. PCT/US2012/041207, International Filing Date Jun. 7, 2012.

Authors: Michael J. Doughty Name of Article: Further assessment of the size, shape and surface features of superficial cells of the bovine corneal epithelium using scanning electron microscopy Published: Current Eye Research; 2004; vol. 28, No. 3, pp. 203-214.

Authors: GL Cennamo, A Del Prete, R Forte, G Cafiero, S Del Prete and D Marasco Name of Article: Impression cytology with scanning electron microscopy: a new method in the study of conjunctival microvilli Published: Eye (2008) vol. 22, pp. 138-143; 2008 Nature Publishing Group.

Authors: Woo Lee, Mi-Kyoung Jin, Won-Cheol Yoo and Jin-Kyu Lee Name of Article: Nanostructuring of a Polymeric Substrate with Well-Defined Nanometer-Scale Topography and Tailored Surface Wettability Published: Langmuir 2004, vol. 20, No. 18, pp. 7665-7669; 2004 American Chemical Society.

Authors: S. Zhao, F. Denes, S. Manolache, R. W. Carpic Name of Article: Nano-Scale Topographic Control of Polymer Surfaces via Buckling Instabilities Published: University of Wisconsin—Madison, Madison, WI 53706.

Authors: Murat Guvendiren, Shu Yang and Jason A. Burdick Name of Article: Swelling-Induced Surface Patterns in Hydrogels with Gradient Crosslinking Density Published: Advanced Functional Materials, 2009, vol. 19, pp. 3038-3045; 2009 Wiley—VCH Verlag GmbH & Co. KGaA, Weinheim.

Authors: Tsugio Amemiya, Hidehiko Yoshida, Masako Yoshida and Hisanori Kawaji Name of Article: Ultrastructures of the Normal Surface of Corneal Epithelium of the Heterozygous Rhino Mouse with Special Reference to So-called Epithelial Holes Published: Albrecht v. Graefes Arch. klin exp. Ophthalmologie 1980, vol. 213, pp. 101-107.

Authors: Pascal M. Pfister, Michael Wendlandt, Peter Neuenschwander, Ulrich W. Suter Name of Article: Surface-textured PEG-based hydrogels with adjustable elasticity; Synthesis and characterization Published: Biomaterials, 2007, vol. 28, pp. 567-575; 2006 Elsevier Ltd.

Authors: H.T. Evensen, H. Jiang, K.W. Gotrik, F. Denes, and R.W. Carpick Name of Article: Transformations in Wrinkle Pattern: Cooperation between Nanoscale Cross-Linked Surface Layers and the Submicrometer Bulk in Wafer-Spun, Plasma-Treated Polydimethylsiloxane Published: American Chemical Society, 2009, vol. 9, No. 8 pp. 2884-2890.

Authors: B. Nichols, C.R. Dawson, and B. Togni Name of Article: Surface Features of the Conjunctiva and Cornea Published: Investigative Ophthalmology & Visual Science, May 1983, vol. 24, pp. 570-576; Association for Research in Vision and Ophthalmology.

Authors: Peter M. Andrews Name of Article: Microplicae: Characteristic Ridge-like Folds of the Plasmalemma Published: The Journal of Cell Biology, 1976, vol. 68, pp. 420-429.

Authors: Barbara A. Nichols, Mary Louise Chiappino, and Chandler R. Dawson, MD Name of Article: Demonstration of the Mucous Layer of the Tear Film by Electron Microscopy Published: Investigative Ophthalmology & Visual Science, 1985, vol. 26, No. 4, pp. 464-473.

Authors: Hua Ai, Steven A. Jones, and Yuri M. Lvov Name of Article: Biomedical Applications of Electrostatic Layer-by-Layer Nano-Assembly of Polymers, Enzymes, and Nanoparticles Published: Cell Biochemistry and Biophysics; 2003; vol. 39; pp. 23-43; Humana Press, Inc.

(56) References Cited

OTHER PUBLICATIONS

Authors: Sang-Kyu Kam, John Gregory Name of Article: Charge determination of synthetic cationic polyelectrolytes by colloid titration Published: Colloids and Surfaces, A: Physicochemical and Engineering Aspects vol. 159 (1999) pp. 165-179; 1999 Elsevier Science B.V.

Website: http://www.btg.com/products Mütek PCD-04 Particle Charge Detector.

* cited by examiner

A

B

SILICONE HYDROGEL LENSES WITH NANO-TEXTURED SURFACES

This application claims the benefit under 35 USC §119 (e) of U.S. provisional application No. 61/494,914 filed on Jun. 9, 2011, incorporated herein by reference in its entirety.

The present invention generally relates to a method for making a silicone hydrogel contact lens having a nano-textured surface which mimics the surface texture of cornea of human eye and silicone hydrogel contact lenses made therefrom.

BACKGROUND

Soft contact lenses have alleviated some of the problems that patients have experienced in not being able to wear hard contact lenses (e.g., RGP lenses) or in not being able to wear them for sufficiently long periods of time, because of initial discomfort (i.e., immediately after lens insertion), relatively long period of adapting time (a week or two) required for a patient to become accustomed to them, and/or improper fit (lenses become dislodged and/or are very uncomfortable).

Although soft contact lenses can improve wearing comfort, there may be some cornea health issues caused by wearing soft contact lenses. Unlike other tissues which receive oxygen from the blood supply, a cornea can only receive oxygen from the surrounding air. But, because soft contact lenses can conform closely to the shape of the eye, oxygen cannot easily circumvent the lens. If sufficient oxygen does not reach the cornea, corneal swelling occurs. Extended periods of oxygen deprivation cause the undesirable growth of blood vessels in the cornea. Soft contact lenses must allow oxygen from the surrounding air (i.e., oxygen) to reach the cornea.

Silicone hydrogel (SiHy) contact lenses have been developed recently to allow sufficient oxygen to permeate through the lens to the cornea and to have minimal adverse effects on corneal health. SiHy contact lenses are made of a hydrated, crosslinked polymeric material that contains silicone and a certain amount of water within the lens polymer matrix at equilibrium. Water in a SiHy contact lens provides the desirable softness that enables the SiHy lens to be worn for sufficiently long periods of time and provides patients with the benefits including adequate initial comfort (i.e., immediately after lens insertion), relatively short period of adapting time required for a patient to become accustomed to them, and/or proper fit. Incorporation of silicone in a SiHy contact lens material may provide the contact lens relatively-high oxygen permeability needed for a healthy cornea.

In recent years, a great number of efforts have been made to develop contact lenses with improved wearing confort. One example is to incorporate leacheable wetting agents in contact lenses (see, e.g., U.S. Pat. Nos. 4,045,547, 4,042,552, 5,198,477, 5,219,965, 6,367,929 and 6,822,016, 7,279,507 and U.S. patent application publication Nos. 2006/0079598A1 and 2006/0251696A1, herein incorporated by reference in their entireties). Another example is to incorporate bioactive agents and hydrophobic comfort agents into contact lenses (see, e.g., U.S. patent application publication No. 2008/0124376A1 and US 2010/A1, herein incorporated by reference in their entireties).

Therefore, there is still a need for SiHy contact lenses with improved wearing confort.

SUMMARY OF THE INVENTION

In one aspect, the invention provides a method for making contact lenses, preferably silicone hydrogel contact lenses, having nano-textured surfaces. A method of the invention comprises the steps of: (1) providing an organic-based coating solution including an organic-based solvent and a polymeric coating material dissolved in the organic-based solvent, wherein the polymeric coating material comprises multiple first reactive functional groups and multiple affinity groups or moieties; (2) contacting a contact lens with the organic-based coating solution to swell the contact lens and form an intermediary coating of the polymeric coating material on the contact lens, wherein the contact lens comprises, at and near the surface of the contact lens, monomeric units and/or hydrophobic moieties and/or segments capable of interacting with the affinity groups or moieties of the polymeric coating material so as to bind the polymeric coating material, wherein the average molecular weight of the polymeric coating material is selected to be sufficient high to ensure that the polymeric coating material partially penetrate into the contact lens swollen by the organic-based solvent; (3) contacting the swollen contact lens having the intermediary coating thereon with an aqueous solution or preferably water to shrink the contact lens having the intermediary coating thereon to form a prime coating having nano-textures on the contact lens; and (4) fixing the nano-textures in the prime coating by crosslinking a water-soluble and crosslinkable hydrophilic polymeric material with multiple second functional reactive functional groups onto the prime coating through the first reactive functional groups to form a crosslinked polymeric coating that perserves the nano-textures of the prime coating and provides a nano-textured surface to the contact lens, wherein one first reactive functional reactive group can react with one second reactive functional group in the presence or absence of a coupling agent to form one crosslinkage between the polymeric coating material and the water-soluble and crosslinkable hydrophilic polymeric material.

In another aspect, the invention provides a silicone hdyrogel contact comprising a silicone hydrogel lens body and a non-silicone hydrogel coating thereon, wherein the coating comprises winkle surface patterns (nano-textures) having a roughness (i.e., an arithmetical mean roughness, Ra) of from about 5 nm to about 600 nm, preferably from about 10 nm to about 400 nm, even more preferably from about 15 nm to about 200 nm, even more preferably from about 20 nm to about 100 nm.

These and other aspects of the invention including various preferred embodiments in any combination will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be effected without departing from the spirit and scope of the novel concepts of the disclosure.

DETAILED DESCRIPTION OF EMBODIMENTS OF THE INVENTION

Figure 1:
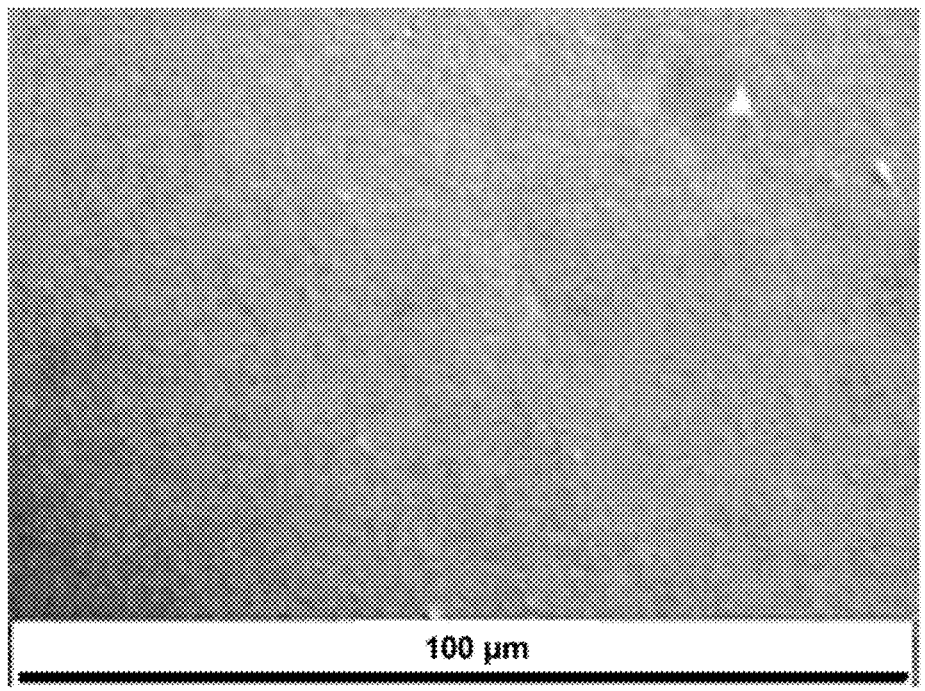
FIG. 1 shows the transmission-differential-interference-contrast (TDIC) images of (A) a SiHy contact lens without nano-textured surfaces and (B) s SiHy contact lens with nano-textured surfaces of the invention according to a preferred embodiment. Both SiHy contact lenses are in hydrated states.
Figure 1:
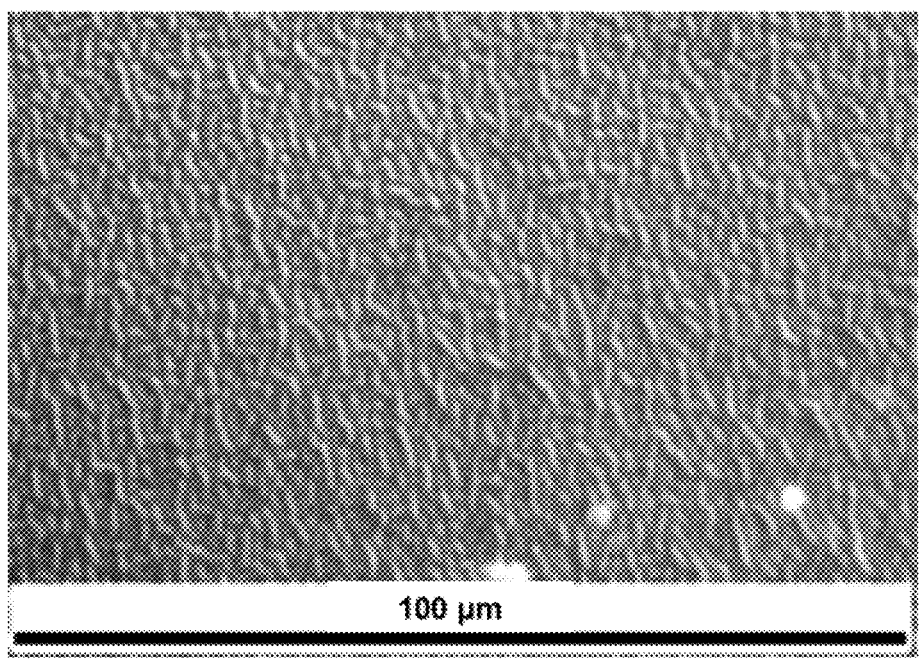

Reference now will be made in detail to the embodiments of the invention. It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

A "hydrogel" refers to a crosslinked polymeric material which is not water-soluble and can contains at least 10% by weight of water within its polymer matrix when fully hydrated.

A "non-silicone hydrogel" refers to a hydrogel that is free of silicone.

A "silicone hydrogel" refers to a hydrogel containing silicone. A silicone hydrogel typically is obtained by copolymerization of a polymerizable composition comprising at least one silicone-containing vinylic monomer or at least one silicone-containing vinylic macromer or at least one silicone-containing prepolymer having ethylenically unsaturated groups.

A "silicone hydrogel contact lens" refers to a contact lens comprising a silicone hydrogel material (or silicone hydrogel).

A "vinylic monomer", as used herein, refers to a compound that has one sole ethylenically unsaturated group and can be polymerized actinically or thermally.

The term "olefinically unsaturated group" or "ethylenically unsaturated group" is employed herein in a broad sense and is intended to encompass any groups containing at least one >C=C<group. Exemplary ethylenically unsaturated groups include without limitation (meth)acryloyl methacryloyl

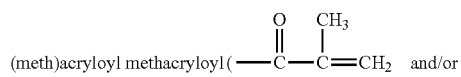
(meth)acryloyl methacryloyl(

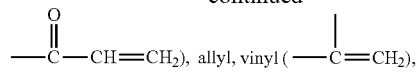

styrenyl, or other C=C containing groups.

The term "(meth)acrylamide" refers to methacrylamide and/or acrylamide.

The term "(meth)acrylate" refers to methacrylate and/or acrylate.

A "hydrophilic vinylic monomer", as used herein, refers to a vinylic monomer which as a homopolymer typically yields a polymer that is water-soluble or can absorb at least 10 percent by weight water.

A "hydrophobic vinylic monomer", as used herein, refers to a vinylic monomer which as a homopolymer typically yields a polymer that is insoluble in water and can absorb less than 10 percent by weight water.

A "macromer" or "prepolymer" refers to a medium and high molecular weight compound or polymer that contains two or more ethylenically unsaturated groups. Medium and high molecular weight typically means average molecular weights greater than 700 Daltons.

A "polymer" means a material formed by polymerizing/crosslinking one or more monomers or macromers or prepolymers.

"Molecular weight" of a polymeric material (including monomeric or macromeric materials), as used herein, refers to the weight-average molecular weight unless otherwise specifically noted or unless testing conditions indicate otherwise.

The term "amino group" refers to a primary or secondary amino group of formula —NHR', where R' is hydrogen or a $C_1$-$C_{20}$ unsubstituted or substituted, linear or branched alkyl group, unless otherwise specifically noted.

The term "phosphorylcholine" refers to a zwitterionic group of

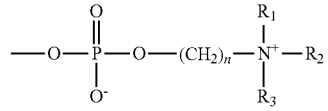

in which n is an integer of 1 to 5 and $R_1$, $R_2$ and $R_3$ independently of each other are $C_1$-$C_8$ alkyl or $C_1$-$C_8$ hydroxyalkyl.

The term "reactive vinylic monomer" refers to a vinylic monomer having a reactive functional group selected from the group consisting of carboxyl groups (—COOH), azetidinium group, amino groups (i.e., primary and/or secondary amino groups), azlactone groups, isocyanate groups, epoxy groups, aziridine groups, or combinations thereof.

The term "non-reactive hydrophilic vinylic monomer" refers to a hydrophilic vinylic monomer which is free of any carboxyl group or amino group (i.e., primary or secondary amino group). A non-reactive vinylic monomer can include a tertiary or quaternium amino group.

An "azetidinium group" refers to a positively charged group of

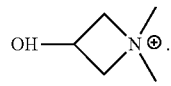

An "azlactone group" refers to a mono-valent radical of

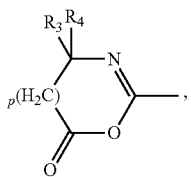

in which p is 0 or 1; $R_3$ and $R_4$ independently can be an alkyl group having 1 to 14 carbon atoms, a cycloalkyl group having 3 to 14 carbon atoms, an aryl group having 5 to 12 ring atoms, an arenyl group having 6 to 26 carbon and 0 to 3 sulfur, nitrogen and/or oxygen atoms, or $R_3$ and $R_4$ taken together with the carbon to which they are joined can form a carbocyclic ring containing 4 to 12 ring atoms The term "thermally-crosslinkable" in reference to a polymeric material or a functional group means that the polymeric material or the functional group can undergo a crosslinking (or coupling) reaction with another material or functional group at a relatively-elevated temperature (from about 40° C. to about 140° C.), whereas the polymeric material or functional group cannot undergo the same crosslinking reaction (or coupling reaction) with another material or functional group at room temperature (i.e., from about 22° C. to about 28° C., preferably from about 24° C. to about 26° C., in particular at about 25° C.) to an extend detectable for a period of about one hour.

An "epichlorohydrin-functionalized polyamine" or "epichlorohydrin-functionalized polyamidoamine" refers to a polymer obtained by reacting a polyamine or polyamidoamine with epichlorohydrin to convert all or a substantial percentage of amine groups of the polyamine or polyamidoamine into azetidinium groups.

The term "water-soluble" in reference to a polymer means that the polymer can be dissolved in water to an extent sufficient to form an aqueous solution of the polymer having a concentration of from about 0.01% to about 30% by weight at room temperature (defined above).

A "water contact angle" refers to an average water contact angle (i.e., contact angles measured by Sessile Drop method), which is obtained by averaging measurements of contact angles with at least 3 individual contact lenses.

The intrinsic "oxygen permeability", Dk, of a material is the rate at which oxygen will pass through a material. In accordance with the invention, the term "oxygen permeability (Dk)" in reference to a hydrogel (silicone or non-silicone) or a contact lens means an oxygen permeability (Dk) which is corrected for the surface resistance to oxygen flux caused by the boundary layer effect according to the procedures shown in Examples hereinafter. Oxygen permeability is conventionally expressed in units of barrers, where "barrer" is defined as $[(cm^3 \text{ oxygen})(mm)/(cm^2)(sec)(mm Hg)] \times 10^{-10}$.

The "oxygen transmissibility", Dk/t, of a lens or material is the rate at which oxygen will pass through a specific lens or material with an average thickness of t [in units of mm] over the area being measured. Oxygen transmissibility is conventionally expressed in units of barrers/mm, where "barrers/mm" is defined as $[(cm^3 \text{ oxygen})/(cm^2)(sec)(mm Hg)] \times 10^{-9}$.

The "ion permeability" through a lens correlates with the Ionoflux Diffusion Coefficient. The Ionoflux Diffusion Coefficient, D (in units of [mm²/min]), is determined by applying Fick's law as follows:

$$D = -n'/(A \times dc/dx)$$

where n'=rate of ion transport [mol/min]; A=area of lens exposed [mm²]; dc=concentration difference [mol/L]; dx=thickness of lens [mm].

A "nano-textured surface" in reference to a contact lens means that a surface of the contact lens has nano-textures. The term "nano-textures" in reference to a coating on a contact lens or a surface of a contact lens is intended to describe wrinkle surface patterns that can be visually observed by examining the contact lens in hydrated state, according to the method of either reflection differential interference contrast (RDIC) or transmission differential interference contrast (TDIC) as described in Example 1, or according to atomic force microscopy (AFM) well known to a person skilled in the art. Wrinkle surface patterns can have any kind of morphology, including, e.g., random and/or ordered worm-like patterns similar to what shown in FIGS. 1(B) and 2(B) of this application, hexanogal patterns (e.g., shown in FIG. 3 of the article by Guvendiren et al., "Swelling-Induced Surface Patterns in Hydrogels with Gradient Crosslinking Density," *Adv. Funct. Mater.* 2009,19: 3038-3045, herein incorporated by reference in its entirety), or combinations thereof. The term "worm-like patterns" refers patterns composed of geometric shapes which assemble worms. The winkle surface patterns (nano-textures) have a roughness (i.e., an arithmetical mean roughness, Ra) of from about 5 nm to about 600 nm, preferably from about 10 nm to about 400 nm, even more preferably from about 15 nm to about 200 nm, even more preferably from about 20 nm to about 100 nm. Preferably, wrinkle surface patterns have a roughness sufficient low to have minimal adverse impact upon the visible light transmissibility of the contact lens under study. The minimal adverse impact of winkled surface patterns upon the visible light transmissibility of the contact lens under study is characterized by a reduction in light transmissibility, $$(\frac{T}{T_o} \times 100\%$$

in which T is the 400-700 nm light transmissibility of a test lens with nano-textured surfaces and $T_o$ is a control lens made of the same material but without nano-textured surfaces), of about 20% or less, preferably about 15% or less, more preferably about 10% or less, even more preferably about 5% or less.

The term "partially penetrate" in reference to a polymeric coating material is intended to describe a process in which the polymeric coating material cannot penetrate into the core of a contact lens but can only be adsorbed/absorbed at and near the surface. Whether a polymeric coating material partially penetrates into a contact lens can be determined by examining fluorescence intensity profiles across the cross sections of a contact lens having a coating of the polymeric coating matering labelled with a fluorescent label in a con-focal laser fluorescence microscopy, as shown in Example.

The invention is generally related to a method for making contact lenses, especially SiHy contact lenses, with nano-textured surfaces which has no or minimal adverse impact on the visible light (400-700 nm) transmissibility of the contact lens. In the prior art, methods for producing contact lenses are generally designed to produce contact lenses having smooth surfaces. In contrast, a method of the invention can be used to produce contact lenses that do not have smooth surface on sub-micron scale but instead have wrinkle surface patterns (i.e., nano-textures), imitating the natural surface of human cornea. The external surface of the corneal epithelium is not a perfectly smooth surface on sub-micron scale but rather exhibits a certain type of surface patterns (i.e., nano-textures) due to the microplicae present on the surface. For example, Michael J. Doughty, in Current Eye Research 28(3): 203-214 (2004), reports that random worm-like patterns are observed in higher magnification SEM images (scanning electron microscopy images, FIG. 5) of superficial corneal epithelial cells of recent post-mortem bovine eyes imaged by scanning electron microscopy, to be associated with the different densities of microplicae on the cell surfaces (herein incorporated by reference in its entirety). Such surface nano-structures may serve as a physico-chemical anchor for the precorneal tear film. The inventors of the invention believe that by having similar nano-textured surface, a contact lens may mimic the natural surface of cornea and provide better wearing comfort.

However, creation of nano-textures on the surface of a contact lens is difficult to achieve through conventional manufacturing processes such as molding or lathing and polishing. It is unexpectedly discovered here that a contact lens with nano-textured surfaces can be produced according a method of the invention involving creating a prime coating having nano-textures through controlled imbibition and/or depositions of a reactive polymeric coating material and fixing the nano-textures by crosslinking a hydrophilic polymeric material onto the prime coating to form a crosslinked polymeric coating that perserves the nano-textures of the prime coating and provides a nano-textured surface to the contact lens.

A contact lens with nano-textured surfaces produced according to a method of the invention may provide the following advantages. First, the nano-textures of a contact lens of the invention can increase the surface area of the contact lens, more closely mimicking that of the natural cornea, while having no or minimal adverse effects upon the light transmissibility of the contact lens. It is believed that when the roughness of the nano-textured surfaces of the contact lens is comparable to the roughness of human cornea, the adverse effects of the nano-textures upon the visible light transmissibility of a contact lens would be minimal or negligible. Like the microplicae on the corneal epithelial cells, the nano-textures may serve to increase the stability and thickness of the pre-lens tear film. Second, the nano-textured surfaces may reduce frictional interaction between the lens and the corneal epithelial surface and may further enhance the biocompatibility of the contact lens. Third, the crosslinked polymeric coating on the contact lens can be a non-silicone hydrogel with high water content when fully hydrated and may impart to the contact lens high biocompatibility, because water is highly biocompatible with the tear and because high water content (e.g., >75% $H_2O$) in the crosslinked polymeric coating is located in and nears the anterior and posterior surfaces with which the eye is in direct contact and where the biocompatibility counts most. It is believed that the outer layer with much higher water content and the nano-textures may have synergy in providing a "water-loving" surface which can attract tears to be spread on the lens surface. Thus, a contact lens of the invention may provide an improved wearing comfort.

In one aspect, the invention provides a method for making contact lenses, preferably silicone hydrogel contact lenses, having nano-textured surfaces, comprising the steps of: (1) providing an organic-based coating solution including an organic-based solvent and a polymeric coating material dissolved in the organic-based solvent, wherein the polymeric coating material comprises multiple first reactive functional groups and multiple affinity groups or moieties; (2) contacting a contact lens with the organic-based coating solution to swell the contact lens and form an intermediary coating of the polymeric coating material on the contact lens, wherein the contact lens comprises, at and near the surface of the contact lens, monomeric units and/or hydrophobic moieties and/or segments capable of interacting with the affinity groups or moieties of the polymeric coating material so as to bind the polymeric coating material, wherein the average molecular weight of the polymeric coating material is selected to be sufficient high to ensure that the polymeric coating material partially penetrate into the contact lens swollen by the organic-based solvent; (3) contacting the swollen contact lens having the intermediary coating thereon with an aqueous solution or preferably water to shrink the contact lens having the intermediary coating thereon to form a prime coating having nano-textures on the contact lens; and (4) fixing the nano-textures in the prime coating by crosslinking a water-soluble and crosslinkable hydrophilic polymeric material with multiple second functional reactive functional groups onto the prime coating through the first reactive functional groups to form a crosslinked polymeric coating that perserves the nano-textures of the prime coating and provides a nano-textured surface to the contact lens, wherein one first reactive functional reactive group can react with one second reactive functional group in the presence or absence of a coupling agent to form one crosslinkage between the polymeric coating material and the water-soluble and crosslinkable hydrophilic polymeric material.

An "organic-based solution" refers to a solution which is a homogeneous mixture consisting of an organic-based solvent and one or more solutes dissolved in the organic based solvent. An organic-based coating solution refers to an organic-based solution containing at least one polymeric coating material as a solute in the solution.

An "organic-based solvent" is intended to describe a solvent system which consists of one or more organic solvents and optionally about 30% or less, preferably about 20% or less, more preferably about 15% or less, even more preferably about 10% or less, in particular about 5% or less by weight of water relative to the weight of the solvent system.

In a preferred embodiment, an organic-based solvent used in preparing an organic-based coating solution can swell a contact lens (to be coated) by at least about 50%, preferably at least about 75%, more preferably at least about 100%, even more preferably at least about 150%. As used in this application, the swell of a contact lens in an organic-based solvent is the percentage increase in diameter of the contact lens relative to the contact lens in hydrated state (fully hydrated in water) and can be calculated by the following equation $$\% \text{ swell} = \frac{\text{lens diameter in an organic based solvent} - \text{lens diameter in water}}{\text{lens diameter in water}} \times 100 \quad (I)$$

Example of preferred organic solvents includes without limitation, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimethyl ether, polyethylene glycols, polypropylene glycols, ethyl acetate, butyl acetate, amyl acetate, methyl lactate, ethyl lactate, i-propyl lactate, a $C_1$-$C_{12}$ alcohol (e.g., 1-butanol, 2-butanol, 1-propanol, 2-propanol, methanol, ethanol, cyclohexanol, cyclopentanol, exonorborneol, 1-pentanol, 2-pentanol, 3-pentanol, 1-hexanol, 2-hexanol, 3-hexanol, 3-methyl-2-butanol, 1-heptanol, 2-heptanol, 1-octanol, 2-octanol, 1-nonanol, 2-nonanol, 1-decanol, 2-decanol, 3-octanol, norborneol, tert-butanol, tert-amyl alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol), 1-methyl-2-pyrrolidone, N,N-dimethylpropionamide, dimethyl formamide, dimethyl acetamide, dimethyl propionamide, N-methylpyrrolidinone, 1,2-propylene glycol, polyethyleneglycol having a molecular weight of about 200 or less, tetrahydrofuran, methylene chloride, and a mixture thereof.

In accordance with the invention, a polymeric coating material must comprises (1) multiple reactive functional groups that can participate in a coupling reaction with the reactive functional groups of a reactive hydrophilic polymeric material in the presence or absence of a coupling agent to form a crosslinked polymeric coating; preferably selected from the group consisting of carboxyl groups (i.e., —COOH), azetidinium group, amino groups (i.e., primary and/or secondary amino groups), azlactone groups, isocyanate groups, epoxy groups, aziridine groups, thiol groups, hydroxyl groups, and combinations thereof, more preferably selected from the group consisting of carboxyl groups, azetidinium groups, amino groups, azlactone groups, isocyanate groups, epoxy groups, aziridine groups, thiol groups, and combinations thereof, even more preferably selected from the group consisting of carboxyl groups, azetidinium group, amino groups, epoxy groups, thiol groups, and combinations thereof, most preferably selected from the group consisting of carboxyl groups, azetidinium group, amino groups, epoxy groups, thiol groups, and combinations thereof; and (2) multiple affinity groups or moieties that are either identical to or different from the reactive functional groups and maintains the polymeric coating material's affinity (i.e., binding) with one or more of monomeric units of a lens material to be coated so as to form a durable prime coating on the contact lens, wherein the affinity groups are selected from the group consisting of carboxyl groups, ammonium groups (i.e., acidified primary, secondary or tertiary amino groups), hydrophobic moieties (e.g., C8-C20 alkyl groups), hydrophobic segments (e.g., tris(trialkylsilyloxy)silyl, di(trialkylsilyloxy)silyl, polydimethylsiloxane, polyproplene oxide, polybutylene oxide), and combinations thereof, preferably selected from the group consisting of carboxyl groups, ammonium groups, and combination thereof. The durability of a prime coating on a contact lens can be determined according to the procedures described in Example 1.

The affinity groups of a polymeric coating material can be: carboxyl groups if a contact lens to be coated contains monomeric units of an amide-containing vinylic monomer (as described below) or an ammonium-containing vinylic monomer (as described below) (i.e., acidified primary, secondary or tertiary amino groups); ammonium groups if a contact lens to be coated contains monomeric units of a carboxyl-containing vinylic monomer (as described below); hydrophobic moieties or segments if a contact lens to be coated contains silicone components. It is believed that the carboxyl groups of a polymeric coating material can interact with amide-type vinylic monomeric units in the lens material through either ionic/polar interaction or hydrogen bonding to maintain an affinity to the lens material; that the carboxyl groups of a polymeric coating material can interact with ammonium-containing vinylic monomeric units in the lens material through ionic/ionic interactions and hydrogen bonding to maintain an affinity to the lens material; that the ammonium groups of a polymeric coating material can interact with carboxyl-containing vinylic monomeric units in the lens material through either ionic/polar interaction or hydrogen bonding to maintain an affinity to the lens material; and that the hydrophobic moieties or segments of a polymeric coating material can interact with silicone components in the lens material through hydrophobic-hydrophobic interactions to maintain an affinity to the lens material.

Amide-containing vinylic monomers have been widely used in making contact lenses. Preferred examples of amide-type vinylic monomers includes without limitation N,N-dimethylacrylamide (DMA), N,N-dimethylmethacrylamide (DMMA), 2-acrylamidoglycolic acid, 3-acryloylamino-1-propanol, N-hydroxyethyl acrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, N-vinyl-2-pyrrolidone (NVP), N-vinyl formamide, N-vinyl acetamide, N-vinyl isopropylamide, N-vinyl-N-methyl acetamide, and mixtures thereof.

An "ammonium group" refers to an acidified primary, secondary or tertiary amino group. Examples of ammonium-containing vinylic monomers include without limitation allylamine, vinylamine, trimethylammonium 2-hydroxy propylmethacrylate, amino-$C_2$-$C_4$ alkyl(meth)acrylate, $C_1$-$C_4$ alkylamino-$C_2$-$C_4$ alkyl(meth)acrylate, vinylamine, amino-$C_2$-$C_4$ alkyl (meth)acrylamide, $C_1$-$C_4$ alkylamino-$C_2$-$C_4$ alkyl(meth)acrylamide, di($C_1$-$C_4$ alkyl)amino-$C_2$-$C_4$ alkyl(meth)acrylate, tri($C_1$-$C_4$ alkyl)amino-$C_2$-$C_4$ alkyl (meth)acrylate, and mixtures thereof.

Examples of carboxyl-containing vinylic monomers include without limitation acrylic acid, a $C_1$-$C_4$ alkylacrylic acid (e.g., methacrylic acid, ethylacrylic acid, propylacrylic acid, butylacrylic acid), N,N-2-acrylamidoglycolic acid, beta methyl-acrylic acid (crotonic acid), alpha-phenyl acrylic acid, beta-acryloxy propionic acid, sorbic acid, angelic acid, cinnamic acid, 1-carboxy-4-phenyl butadiene-1,3, itaconic acid, citraconic acid, mesaconic acid, glutaconic acid, aconitic acid, maleic acid, fumaric acid, and combination thereof.

Any polymer or copolymer having above-described reactive functional and affinity groups can be used in the invention so long as it can be dissolved in an organic-based solvent at room temperature in an amount of from about 0.001% to about 1.5%, preferably from about 0.002% to about 1%, more preferably from 0.003% to about 0.5% by weight relative to the total weight of the organic-based coating solution. An organic-based coating solution can be prepared by dissolving a given amount of a polymeric coating material in an organic-based solvent (any one described above) to have a concentration described above. It is believed that an organic-based solvent can swell a contact lens so that a portion of the polymeric coating material may penetrate into the contact lens and increase the durability of the prime coating. It is also believed that the physical entanglement of the polymeric coating material with a lens material near lens surface may ensure subsequent differential shrinkage between the lens material and the polymeric coating material so as to generate nano-textures in the coating (new lens surface) during the step of contacting with water or a water-based solvent.

Examples of preferred polymeric coating materials includes without limitation: (1) homopolymers of an ammonium-containing vinylic monomer (any one of those described above) or a carboxyl-containing vinylic monomer (any one of those described above); (2) copolymer of one or more ammonium-containing and/or carboxyl-containing vinylic monomers (those described above); (3) copolymer of one or more ammonium-containing and/or carboxyl-containing vinylic monomers (those described above) with a non-reactive vinylic monomer selected from the group consisting of (meth)acrylamide, N,N-dimethyl(meth)acrylamide, N-vinylpyrrolidone (NVP), N,N-dimethylaminoethyl(meth)acrylate, N,N-dimethylaminopropyl (meth)acrylamide, glycerol methacrylate, 3-acryloylamino-1-propanol, N-hydroxyethyl acrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 2-hydroxyethyl(meth)acrylate, hydroxypropyl(meth)acrylate, $C_1$-$C_4$-alkoxy polyethylene glycol (meth)acrylate having a weight average molecular weight of up to 1500 Daltons, N-vinyl formamide, N-vinyl acetamide, N-vinyl isopropylamide, N-vinyl-N-methyl acetamide, allyl alcohol, vinyl alcohol (hydrolyzed form of vinyl acetate in the copolymer), a phosphorylcholine-containing vinylic monomer (including (meth)acryloyloxyethyl phosphorylcholine and those described in U.S. Pat. No. 5,461,433, herein incorporated by reference in its entirety), and combinations thereof and optionally with one or more reactive vinylic monomer having a reactive functional group selected from the group consisting of azetidinium group, azlactone groups, isocyanate groups, epoxy groups, aziridine groups, and combinations thereof; (4) polyethyleneimine (PEI); (5) polyvinylalcohol with pendant primary and/or secondary amino groups; (6) block copolymers including at least one hydrophobic segments (preferably selected from the group consisting of polydimethylsiloxane, poly(proplene oxide), poly(butylene oxide), a polymer chain or segment consisting essentially of one or more silicone-containing vinylic monomers (preferably those described below), $C_8$-$C_{16}$ alkyl(meth)acrylate, and/or $C_8$-$C_{16}$ alkyl (meth)acrylamide, and combinations thereof) and polymeric segments having reactive functional groups selected from the group consisting of azetidinium group, azlactone groups, isocyanate groups, epoxy groups, aziridine groups, thiol groups, and combinations thereof; (7) combination thereof.

Examples of preferred silicone-containing vinylic monomers include without limitation N-[tris(trimethylsiloxy)silylpropyl]-(meth)acrylamide, N-[tris(dimethylpropylsiloxy)silylpropyl]-(meth)acrylamide, N-[tris(dimethylphenylsiloxy)silylpropyl] (meth)acrylamide, N-[tris(dimethylethylsiloxy)silylpropyl] (meth)acrylamide, N-(2-hydroxy-3-(3-(bis(trimethylsilyloxy)methylsilyl)propyloxy)propyl)-2-methyl acrylamide; N-(2-hydroxy-3-(3-(bis(trimethylsilyloxy)methylsilyl)propyloxy)propyl)acrylamide; N,N-bis[2-hydroxy-3-(3-(bis(trimethylsilyloxy)methylsilyl)propyloxy)propyl]-2-methyl acrylamide; N,N-bis[2-hydroxy-3-(3-(bis(trimethylsilyloxy)methylsilyl)propyloxy)propyl]acrylamide; N-(2-hydroxy-3-(3-(tris(trimethylsilyloxy)silyl)propyloxy)propyl)-2-methyl acrylamide; N-(2-hydroxy-3-(3-(tris(trimethylsilyloxy)silyl)propyloxy)propyl)acrylamide; N,N-bis[2-hydroxy-3-(3-(tris(trimethylsilyloxy)silyl)propyloxy)propyl]-2-methyl acrylamide; N,N-bis[2-hydroxy-3-(3-(tris(trimethylsilyloxy)silyl)propyloxy)propyl]acrylamide; N-[2-hydroxy-3-(3-(t-butyldimethylsilyl)propyloxy)propyl]-2-methyl acrylamide; N-[2-hydroxy-3-(3-(t-butyldimethylsilyl)propyloxy)propyl] acrylamide; N,N-bis[2-hydroxy-3-(3-(t-butyldimethylsilyl)propyloxy)propyl]-2-methyl acrylamide; N,N-bis[2-hydroxy-3-(3-(t-butyldimethylsilyl)propyloxy)propyl] acrylamide; 3-methacryloxy propylpentamethyldisiloxane, tris(trimethylsilyloxy)silylpropyl methacrylate (TRIS), (3-methacryloxy-2-hydroxypropyloxy)propylbis(trimethylsiloxy)methylsilane), (3-methacryloxy-2-hydroxypropyloxy)propyltris(trimethylsiloxy)silane, 3-methacryloxy-2-(2-hydroxyethoxy)-propyloxy)propylbis(trimethylsiloxy) methylsilane, N-2-methacryloxyethyl-O-(methyl-bis-trimethylsiloxy-3-propyl)silyl carbamate, 3-(trimethylsilyl) propylvinyl carbonate, 3-(vinyloxycarbonylthio)propyl-tris (trimethyl-siloxy)silane, 3-[tris(trimethylsiloxy)silyl] propylvinyl carbamate, 3-[tris(trimethylsiloxy)silyl]propyl allyl carbamate, 3-[tris(trimethylsiloxy)silyl]propyl vinyl carbonate, t-butyldimethyl-siloxyethyl vinyl carbonate; trimethylsilylethyl vinyl carbonate, and trimethylsilylmethyl vinyl carbonate). Most preferred siloxane-containing (meth) acrylamide monomers of formula (1) are N-[tris(trimethylsiloxy)silylpropyl]acrylamide, TRIS, N-[2-hydroxy-3-(3-(t-butyldimethylsilyl)propyloxy)propyl]acrylamide.

It is understood that a polymeric coating material can comprise monomeric units of one or more reactive vinylic monomers so as to have multiple reactive functional groups. Exemplary reactive vinylics includes azetidinium-containing vinylic monomers, azlactone-containing vinylic monomers, isocyanate-containing vinylic monomers, epoxy-containing vinylic monomers, and aziridinyl-containing vinylic monomers. Examples of aziridinyl-containing vinylic monomers include without limitation 2-(1-aziridinyl)ethyl(meth)acrylate, 3-(1-aziridinyl) propyl (meth)acrylate, 4-(1-aziridinyl) butyl(meth)acrylate, 6-(1-aziridinyl) hexyl(meth)acrylate, and 8-(1-aziridinyl) octyl(meth)acrylate). Examples of epoxy-containing vinylic monomers include without limitation glycidyl(meth)acrylate, vinyl glycidyl ether, allyl glycidyl ether. Examples of isocyanate-containing vinylic monomers include without limitation 2-isocyanatoethyl (meth) acrylate, 3-isocyanatopropyl(meth)acrylate, 4-isocyanatobutyl(meth)acrylate, 6-isocyanatohexyl(meth) acrylate, 1-methyl-2-isocyanatoethyl methacrylate, and 1,1-dimethyl-2-isocyanatoethyl methacrylate. Examples of azlactone-containing vinylic monomers include without limitation 2-vinyl-4,4-dimethyl-1,3-oxazolin-5-one, 2-isopropenyl-4,4-dimethyl-1,3-oxazolin-5-one, 2-vinyl-4-methyl-4-ethyl-1,3-oxazolin-5-one, 2-isopropenyl-4-methyl-4-butyl-1,3-oxazolin-5-one, 2-vinyl-4,4-dibutyl-1,3-oxazolin-5-one, 2-isopropenyl-4-methyl-4-dodecyl-1,3-oxazolin-5-one, 2-isopropenyl-4,4-diphenyl-1,3-oxazolin-5-one, 2-isopropenyl-4,4-pentamethylene-1,3-oxazolin-5-one, 2-isopropenyl-4,4-tetramethylene-1,3-oxazolin-5-one, 2-vinyl-4,4-diethyl-1,3-oxazolin-5-one, 2-vinyl-4-methyl-4- nonyl-1,3-oxazolin-5-one, 2-isopropenyl-4-methyl-4-phenyl-1,3-oxazolin-5-one, 2-isopropenyl-4-methyl-4-benzyl-1,3-oxazolin-5-one, 2-vinyl-4,4-pentamethylene-1,3-oxazolin-5-one, and 2-vinyl-4,4-dimethyl-1,3-oxazolin-6-one, with 2-vinyl-4,4-dimethyl-1,3-oxazolin-5-one (VDMO) and 2-isopropenyl-4,4-dimethyl-1,3-oxazolin-5-one (IPDMO) as preferred azlactone-containing vinylic monomers. Azetidinium-containing vinylic monomers can be obtained by reacting epichlorohydrin with a vinylic monomer containing primary or secondary amino groups (any those described above) according to procedures similar to what described in EP1465931 (herein incorporated by reference in its entirety).

Preferably, a polymeric coating material is a polymer or copolymer comprising at least about 70% by mole, preferably at least about 80% by mole, more preferably at least about 90% by mole, even more preferably at least about 95% by mole of monomeric units of one or more carboxyl-containing vinylic monomers, wherein the one or more carboxyl-containing vinylic monomers are selected from the group consisting of acrylic acid, a $C_1$-$C_4$ alkylacrylic acid (e.g., methacrylic acid, ethylacrylic acid, propylacrylic acid, butylacrylic acid), N,N-2-acrylamidoglycolic acid, beta methyl-acrylic acid (crotonic acid), alpha-phenyl acrylic acid, beta-acryloxy propionic acid, sorbic acid, angelic acid, cinnamic acid, 1-carboxy-4-phenyl butadiene-1,3, itaconic acid, citraconic acid, mesaconic acid, glutaconic acid, aconitic acid, maleic acid, fumaric acid, and combination thereof. Examples of preferred carboxyl-containing polymeric coating materials include without limitation linear or branched polyacrylic acid; linear or branched polymethacrylic acid; linear or branched poly(acrylic acid-co-acrylamide) having at least about 70% by mole, preferably at least about 80% by mole, more preferably at least about 90% by mole, even more preferably at least about 95% by mole of acrylic acid; linear or branched poly(methacrylic acid-co-acrylamide) having at least about 70% by mole, preferably at least about 80% by mole, more preferably at least about 90% by mole, even more preferably at least about 95% by mole of methacrylic acid; linear or branched poly(acrylic acid-co-vinylpyrrolidone) having at least about 70% by mole, preferably at least about 80% by mole, more preferably at least about 90% by mole, even more preferably at least about 95% by mole of acrylic acid; linear or branched poly(methacrylic acid-co-vinylpyrrolidone) having at least about 70% by mole, preferably at least about 80% by mole, more preferably at least about 90% by mole, even more preferably at least about 95% by mole of methacrylic acid.

In accordance with the invention, the weight average molecular weight $M_w$ of a polymeric coating material is preferably at least about 25,000 Daltons, more preferably at least about 50,000 Daltons, even more preferably at least about 75,000 Daltons, most preferably from about 100,000 to 1,000,000 Daltons.

A contact lens can be any commercial contact lenses or any ones made according to any methods well known to a person skilled in the art. For example, contact lenses can be produced in a conventional "spin-casting mold," as described for example in U.S. Pat. No. 3,408,429, or by the full cast-molding process in a static form, as described in U.S. Pat. Nos. 4,347,198; 5,508,317; 5,583,463; 5,789,464; and 5,849,810, or by lathe cutting of silicone hydrogel buttons as used in making customized contact lenses. In cast-molding, a lens formulation typically is dispensed into molds and cured (i.e., polymerized and/or crosslinked) in molds for making contact lenses.

For production of SiHy contact lenses, a SiHy lens formulation for cast-molding or spin-cast molding or for making SiHy rods used in lathe-cutting of contact lenses generally comprises at least one components selected from the group consisting of a silicone-containing vinylic monomer, a silicone-containing vinylic macromer, a silicone-containing prepolymer, a hydrophilic vinylic monomer, a hydrophobic vinylic monomer, a crosslinking agent, a free-radical initiator (photoinitiator or thermal initiator), a hydrophilic vinylic macromer/prepolymer, and combination thereof, as well known to a person skilled in the art. A SiHy contact lens formulation can also comprise other necessary components known to a person skilled in the art, such as, for example, a UV-absorbing agent, a visibility tinting agent (e.g., dyes, pigments, or mixtures thereof), antimicrobial agents (e.g., preferably silver nanoparticles), a bioactive agent, leachable lubricants, leachable tear-stabilizing agents, and mixtures thereof, as known to a person skilled in the art. Resultant SiHy contact lenses then can be subjected to extraction with an extraction solvent to remove unpolymerized components from the resultant lenses and to hydration process, as known by a person skilled in the art.

Any suitable silicone-containing vinylic monomers or macromers can be used in the invention. In addition to silicone-containing vinylic monomers described above, polysiloxane-containing vinylic monomers or macromers and silicone-containing prepolymers can also be used in the invention. Examples of preferred polysiloxane-containing vinylic monomers or macromers are monomethacrylated or monoacrylated polydimethylsiloxanes of various molecular weight (e.g., mono-3-methacryloxypropyl terminated, mono-butyl terminated polydimethylsiloxane or mono-(3-methacryloxy-2-hydroxypropyloxy)propyl terminated, mono-butyl terminated polydimethylsiloxane); dimethacrylated or diacrylated polydimethylsiloxanes of various molecular weight; vinyl carbonate-terminated polydimethylsiloxanes; vinyl carbamate-terminated polydimethylsiloxane; vinyl terminated polydimethylsiloxanes of various molecular weight; methacrylamide-terminated polydimethylsiloxanes; acrylamide-terminated polydimethylsiloxanes; acrylate-terminated polydimethylsiloxanes; methacrylate-terminated polydimethylsiloxanes; bis-3-methacryloxy-2-hydroxypropyloxypropyl polydimethylsiloxane; N,N,N',N'-tetrakis(3-methacryloxy-2-hydroxypropyl)-alpha,omega-bis-3-aminopropyl-polydimethylsiloxane; polysiloxanylalkyl(meth)acrylic monomers; siloxane-containing macromer selected from the group consisting of Macromer A, Macromer B, Macromer C, and Macromer D described in U.S. Pat. No. 5,760,100 (herein incorporated by reference in its entirety); the reaction products of glycidyl methacrylate with amino-functional polydimethylsiloxanes; hydroxyl-functionalized siloxane-containing vinylic monomers or macromers; polysiloxane-containing macromers disclosed in U.S. Pat. Nos. 4,136,250, 4,153,641, 4,182,822, 4,189,546, 4,343,927, 4,254,248, 4,355,147, 4,276,402, 4,327,203, 4,341,889, 4,486,577, 4,543,398, 4,605,712, 4,661,575, 4,684,538, 4,703,097, 4,833,218, 4,837,289, 4,954,586, 4,954,587, 5,010,141, 5,034,461, 5,070,170, 5,079,319, 5,039,761, 5,346,946, 5,358,995, 5,387,632, 5,416,132, 5,451,617, 5,486,579, 5,962,548, 5,981,675, 6,039,913, and 6,762,264 (here incorporated by reference in their entireties); polysiloxane-containing macromers disclosed in U.S. Pat. Nos. 4,259,467, 4,260,725, and 4,261,875 (herein incorporated by reference in their entireties). Di- and tri-block macromers consisting of polydimethylsiloxane and polyalkyleneoxides could also be of utility. For example one might use methacrylate end capped polyethyleneoxide-block-polydimethylsiloxane-block-polyethyleneoxide to enhance oxygen permeability. Suitable monofunctional hydroxyl-functionalized siloxane-containing vinylic monomers/macromers and suitable multifunctional hydroxyl-functionalized siloxane-containing vinylic monomers/macromers are commercially available from Gelest, Inc, Morrisville, Pa.

Examples of preferred silicon-containing prepolymers include those described in commonly-owned U.S. Pat. Nos. 6,039,913, 7,091,283, 7,268,189 and 7,238,750, 7,521,519; commonly-owned US patent application publication Nos. US 2008-0015315 A1, US 2008-0143958 A1, US 2008-0143003 A1, US 2008-0234457 A1, US 2008-0231798 A1, and commonly-owned U.S. patent application Nos. 61/180,449 and 61/180,453; all of which are incorporated herein by references in their entireties.

Examples of preferred hydrophilic vinylic monomers are N,N-dimethylacrylamide (DMA), N,N-dimethylmethacrylamide (DMMA), 2-acrylamidoglycolic acid, 3-acryloylamino-1-propanol, N-hydroxyethyl acrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, 2-hydroxyethylmethacrylate (HEMA), 2-hydroxyethyl acrylate (HEA), hydroxypropyl acrylate, hydroxypropyl methacrylate (HPMA), trimethylammonium 2-hydroxy propylmethacrylate hydrochloride, aminopropyl methacrylate hydrochloride, dimethylaminoethyl methacrylate (DMAEMA), glycerol methacrylate (GMA), N-vinyl-2-pyrrolidone (NVP), allyl alcohol, vinylpyridine, a $C_1$-$C_4$-alkoxy polyethylene glycol (meth)acrylate having a weight average molecular weight of up to 1500, methacrylic acid, N-vinyl formamide, N-vinyl acetamide, N-vinyl isopropylamide, N-vinyl-N-methyl acetamide, allyl alcohol, N-vinyl caprolactam, and mixtures thereof.

Examples of preferred hydrophobic vinylic monomers include methylacrylate, ethyl-acrylate, propylacrylate, isopropylacrylate, cyclohexylacrylate, 2-ethylhexylacrylate, methylmethacrylate, ethylmethacrylate, propylmethacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyl toluene, vinyl ethyl ether, perfluorohexylethyl-thio-carbonyl-aminoethyl-methacrylate, isobornyl methacrylate, trifluoroethyl methacrylate, hexafluoro-isopropyl methacrylate, hexafluorobutyl methacrylate.

Examples of preferred cross-linking agents include without limitation tetraethyleneglycol diacrylate, triethyleneglycol diacrylate, ethyleneglycol diacylate, diethyleneglycol diacrylate, tetraethyleneglycol dimethacrylate, triethyleneglycol dimethacrylate, ethyleneglycol dimethacylate, diethyleneglycol dimethacrylate, trimethylopropane trimethacrylate, pentaerythritol tetramethacrylate, bisphenol A dimethacrylate, vinyl methacrylate, ethylenediamine dimethyacrylamide, ethylenediamine diacrylamide, glycerol dimethacrylate, triallyl isocyanurate, triallyl cyanurate, allylmethacrylate, allylmethacrylate, 1,3-bis(methacrylamidopropyl)-1,1,3,3-tetrakis(trimethylsiloxy)disiloxane, N,N'-methylenebisacrylamide, N,N'-methylenebismethacrylamide, N,N'-ethylenebisacrylamide, N,N'-ethylenebismethacrylamide, 1,3-bis(N-methacrylamidopropyl)-1,1,3,3-tetrakis-(trimethylsiloxy)disiloxane, 1,3-bis(methacrylamidobutyl)-1,1,3,3-tetrakis(trimethylsiloxy)-disiloxane, 1,3-bis(acrylamidopropyl)-1,1,3,3-tetrakis(trimethylsiloxy)disiloxane, 1,3-bis(methacryloxyethylureidopropyl)-1,1,3,3-tetrakis(trimethylsiloxy)disiloxane, and combinations thereof. A preferred cross-linking agent is tetra(ethyleneglycol)diacrylate, tri(ethyleneglycol) diacrylate, ethyleneglycol diacrylate, di(ethyleneglycol)diacrylate, methylenebisacrylamide, triallyl isocyanurate, or triallyl cyanurate. The amount of a cross-linking agent used is expressed in the weight content with respect to the total polymer and is preferably in the range from about 0.05% to about 4%, and more preferably in the range from about 0.1% to about 2%.

Examples of suitable thermal initiators include, but are not limited to, 2,2'-azobis(2,4-dimethylpentanenitrile), 2,2'-azobis(2-methylpropanenitrile), 2,2'-azobis(2-methylbutanenitrile), peroxides such as benzoyl peroxide, and the like. Preferably, the thermal initiator is 2,2'-azobis(isobutyronitrile) (AIBN).

Suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 2959®. Examples of benzoylphosphine initiators include 2,4,6-trimethylbenzoyldiphenylophosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329, herein incorporated by reference in its entirety. The polymerization can then be triggered off by actinic radiation, for example light, in particular UV light of a suitable wavelength. The spectral requirements can be controlled accordingly, if appropriate, by addition of suitable photosensitizers.

Any suitable polymerizable UV-absorbing agents can be used in the invention. Preferably, a polymerizable UV-absorbing agent comprises a benzotriazole-moiety or a benzophenone-moiety. Examples of preferred polymerizable UV absorbers include without limitation 2-(2-hydroxy-5-vinylphenyl)-2H-benzotriazole, 2-(2-hydroxy-5-acrylyloxyphenyl)-2H-benzotriazole, 2-(2-hydroxy-3-methacrylamido methyl-5-tert octylphenyl)benzotriazole, 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butylphenyl)-5-chlorobenzotriazole, 2-(2'-hydroxy-5'-methacryloxyethylphenyl)benzotriazole, 2-(2'-hydroxy-5'-methacryloxypropylphenyl)benzotriazole, 2-hydroxy-4-acryloxy alkoxy benzophenone, 2-hydroxy-4-methacryloxy alkoxy benzophenone, allyl-2-hydroxybenzophenone, 2-hydroxy-4-methacryloxy benzophenone.

The bioactive agent is any compound that can prevent a malady in the eye or reduce the symptoms of an eye malady. The bioactive agent can be a drug, an amino acid (e.g., taurine, glycine, etc.), a polypeptide, a protein, a nucleic acid, or any combination thereof. Examples of drugs useful herein include, but are not limited to, rebamipide, ketotifen, olaptidine, cromoglycolate, cyclosporine, nedocromil, levocabastine, lodoxamide, ketotifen, or the pharmaceutically acceptable salt or ester thereof. Other examples of bioactive agents include 2-pyrrolidone-5-carboxylic acid (PCA), alpha hydroxyl acids (e.g., glycolic, lactic, malic, tartaric, mandelic and citric acids and salts thereof, etc.), linoleic and gamma linoleic acids, and vitamins (e.g., B5, A, B6, etc.).

Examples of leachable lubricants include without limitation mucin-like materials (e.g., polyglycolic acid) and non-crosslinkable hydrophilic polymers (i.e., without ethylenically unsaturated groups). Any hydrophilic polymers or copolymers without any ethylenically unsaturated groups can be used as leachable lubricants. Preferred examples of non-crosslinkable hydrophilic polymers include, but are not limited to, polyvinyl alcohols (PVAs), polyamides, polyimides, polylactone, a homopolymer of a vinyl lactam, a copolymer of at least one vinyl lactam in the presence or in the absence of one or more hydrophilic vinylic comonomers, a homopolymer of acrylamide or methacrylamide, a copolymer of acrylamide or methacrylamide with one or more hydrophilic vinylic monomers, polyethylene oxide (i.e., polyethylene glycol (PEG)), a polyoxyethylene derivative, poly-N-N-dimethylacrylamide, polyacrylic acid, poly 2 ethyl oxazoline, heparin polysaccharides, polysaccharides, and mixtures thereof. The weight-average molecular weight $M_w$ of the non-crosslinkable hydrophilic polymer is preferably from 5,000 to 500,000, more preferably from 10,000 to 300,000, even more preferably from 20,000 to 100,000.

Examples of leachable tear-stabilizing agents include, without limitation, phospholipids, monoglycerides, diglycerides, triglycerides, glycolipids, glyceroglycolipids, sphingolipids, sphingo-glycolipids, fatty alcohols, fatty acids, mineral oils, and mixtures thereof. Preferably, a tear stabilizing agent is a phospholipid, a monoglyceride, a diglyceride, a triglyceride, a glycolipid, a glyceroglycolipid, a sphingolipid, a sphingo-glycolipid, a fatty acid having 8 to 36 carbon atoms, a fatty alcohol having 8 to 36 carbon atoms, or a mixture thereof.

In accordance with the invention, a lens formulation can be a solution or a melt at a temperature from about 20° C. to about 85° C. Preferably, a polymerizable composition is a solution of all desirable components in a suitable solvent, or a mixture of suitable solvents.

A lens formulation can be prepared by dissolving all of the desirable components in any suitable solvent known to a person skilled in the art. All of the exemplary solvents described above can be used in preparing a lens formulation.

Numerous SiHy lens formulations have been described in numerous patents and patent applications published by the filing date of this application. All of them can be used in obtaining a SiHy lens which in turn becomes the inner layer of a SiHy contact lens of the invention., so long as they will yield a SiHy material having a Dk and water content specified above. A SiHy lens formulation for making commercial SiHy lenses, such as, lotrafilcon A, lotrafilcon B, balafilcon A, galyfilcon A, senofilcon A, narafilcon A, narafilcon B, comfilcon A, enfilcon A, can also be used in making SiHy contact lenses.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. Nos. 4,444,711 to Schad; 4,460,534 to Boehm et al.; 5,843,346 to Morrill; and 5,894,002 to Boneberger et al., which are also incorporated herein by reference.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

In a preferred embodiment, reusable molds are used and the silicone-hydrogel lens-forming composition is cured actinically under a spatial limitation of actinic radiation to form a SiHy contact lens. Examples of preferred reusable molds are those disclosed in U.S. patent application Ser. Nos. 08/274,942 filed Jul. 14, 1994, 10/732,566 filed Dec. 10, 2003, 10/721,913 filed Nov. 25, 2003, and U.S. Pat. No. 6,627,124, which are incorporated by reference in their entireties. Reusable molds can be made of quartz, glass, sapphire, $CaF_2$, a cyclic olefin copolymer (such as for example, Topas® COC grade 8007-S10 (clear amorphous copolymer of ethylene and norbornene) from Ticona GmbH of Frankfurt, Germany and Summit, N.J., Zeonex® and Zeonor® from Zeon Chemicals LP, Louisville, Ky.), polymethylmethacrylate (PMMA), polyoxymethylene from DuPont (Delrin), Ultem® (polyetherimide) from G.E. Plastics, PrimoSpire®, etc.

Contacting of a contact lens with an organic-based solution of a polymeric coating material can occur by dipping the contact lens in a bath of a coating solution for a period of time or alternatively dipping the contact lens sequentially in a series of bath of coating solutions for a fixed shorter time period for each bath. The contacting time of a contact lens with a coating solution of a reactive polymer may last up to about 10 minutes, preferably from about 5 to about 360 seconds, more preferably from about 5 to about 250 seconds, even more preferably from about 5 to about 200 seconds.

An "aqueous solution" is intended to describe an homogeneous solution in which water is the solvent and at least one solute, which is selected from the group consisting of at least one organic solvent, at least one salt, at least one buffering agent, at least one lubricant (e.g., a hydrophilic polymer), at least one surfactant, and combination thereof, is dissolved in water. It should be understood that in order to form a prime coating having nano-textures (i.e., winkled surface patterns in the prime coating) of the contact lens, the aqueous solution used in shrinking the contact lens having the coating thereon cannot swell the contact lens by more than about 20%, preferably more than about 15%, more preferably more than about 10%, even more preferably more than about 5%; and that the amount of the at least one solute is about 30% or less, preferably about 20% or less, more preferably about 15% or less, even more preferably about 10% or less, in particular about 5% or less by weight relative to the weight of the aqueous solution. It should be understood that the above values of swelling are calculated based on Eq. (I) described above.

Contacting of the swollen contact lens having the intermediary coating thereon with water or an aqueous solution can occur by dipping the contact lens in a bath of water or an aqueous solution for a period of time or alternatively dipping the contact lens sequentially in a series of bath of water or aqueous solutions for a fixed shorter time period for each bath. The contacting time of the swollen contact lens having the intermediary coating with water or an aqueous solution may last up to about 10 minutes, preferably from about 5 to about 360 seconds, more preferably from about 5 to about 250 seconds, even more preferably from about 5 to about 100 seconds. Winkled surface patterns (i.e., nano-textures) in the prime coating can be created during the fast shrinking of the swollen contact lens having the intermediary coating thereon. However, it is found that the resultant winkled surface patterns in the prime coating is not permanent and can gradually disappear under certain conditions, for example, if contact lenses with prime coatings having winkled surface patterns are hydrated with water overnight, or if the contact lenses are soaked in an organic based solvent for up to about 1 minute and followed by hydrating in water.

The degree of nano-structures on the lens surface can be controlled in order to optimize the size and degree of the nano-structures so that they do not cause unacceptable light scattering. Methods of controlling the degree of nano-structures on the surface include but are not limited to the following. For examples, one can adjust the degree of lens swelling by appropriate selection of the organic solvent (or organic/water mixture) containing the primer coating polymer, adjust the rate at which the lens shrinks back to its equilibrium size in water by using an intermediate water/organic bath to slow the shrinkage rate, adjust the lens exposure times in the coating and rinsing baths, adjust the time between the application of the primer coating and the surface crosslinking step, and combinations thereof.

The nano-textures in the prime coating are fixed (i.e., rendering the winkle surface pattern relatively permanent) by crosslinking the polymeric coating material with a water-soluble and crosslinkable hydrophilic polymeric material having multiple second reactive functional groups, to form a crosslinked polymeric coating that perserves the nano-textures of the prime coating and provides a nano-textured surface to the contact lens. The reactive functional groups of a water-soluble and crosslinkable hydrophilic polymeric material can be: carboxyl groups, azetidinium group, amino groups, azlactone groups, isocyanate groups, epoxy groups, aziridine groups, hydroxyl groups, thiol groups, or combinations thereof; preferably carboxyl groups, azetidinium groups, amino groups, azlactone groups, isocyanate groups, epoxy groups, aziridine groups, thiol groups, or combinations thereof; more preferably carboxyl groups, azetidinium group, amino groups, epoxy groups, thiol groups, or combinations thereof; even more preferably azetidinium group, epoxy groups, or combinations thereof, provided that one second reactive functional group can react (in a coupling reaction) with one first reactive functional group of the polymeric coating material in the presence or preferably absence of a coupling agent to form a crosslinkage.

A "crosslinked hydrophilic polymeric coating" as used in this application means a layer of a crosslinked polymeric material having a three-dimensional network that can contain water when fully hydrated. The three-dimensional network of a crosslinked polymeric material can be formed by crosslinking of two or more linear or branched polymers through crosslinkages.

Coupling reactions between a pair of reactive functional groups are well known reactions under the conditions that are customary for formation of covalent linkages. For example, an amino group reacts with aldehyde group to form a Schiff base which may further be reduced; an amino group —NHR' reacts with an acid anhydride group to form an amide linkage (—CO—NR'—); an amino group —NHR' reacts with an isocyanate group to form a urea linkage (—NR''—C(O)—NH—); an amino group —NHR' reacts with an epoxy or aziridine group to form an amine bond (—C—NR'—); an amino group —NHR' reacts (ring-opening) with an azlactone group to form an alkylene-diamido linkage (—C(O)NH-alkylene-C(O)NR'—); an amino group —NHR' reacts with a carboxylic acid group in the presence of a coupling agent—carbodiimide (e.g., 1-ethyl-3-(3-dimethylaminopropyl) carbodiimide (EDC), N,N'-dicyclohexylcarbodiimide (DCC), 1-cylcohexyl-3-(2-morpholinoethyl)carbodiimide, diisopropyl carbodiimide, or mixtures thereof) to form an amide linkage; a hydroxyl reacts with an isocyanate to form a urethane linkage; a hydroxyl reacts with an epoxy or aziridine to form an ether linkage (—O—); a hydroxyl reacts with an acid chloride or bromide group or with an acid anhydride group to form an ester linkage; an hydroxyl group reacts with an azlactone group in the presence of a catalyst to form an amidoalkylenecarboxy linkage (—C(O)NH-alkylene-C(O)—O—); a carboxyl group reacts with an epoxy group to form an ester bond; a thiol group (—SH) reacts with an isocyanate to form a thiocarbamate linkage (—NH—C(O)—S—); a thiol group reacts with an epoxy or aziridine to form a thioether linkage (—S—); a thiol group reacts with an acid anhydride group to form a thiolester linkage; a thiol group reacts with an azlactone group in the presence of a catalyst to form a linkage (—C(O)NH—CR$_3$R$_4$—(CH$_2$)$_p$—C(O)—S—). It is also understood that coupling agents with two reactive functional groups may be used in the coupling reactions. A coupling agent having two reactive functional groups can be a diisocyanate, a di-acid halide, a di-carboxylic acid compound, a di-acid halide compound, a di-azlactone compound, a di-epoxy compound, a diamine, or a diol. A person skilled in the art knows well to select a coupling reaction (e.g., anyone described above in this application) and conditions thereof to prepare a polysiloxane terminated with one or more ethylenically unsaturated groups. For example, a diisocyanate, di-acid halide, di-carboxylic acid, di-azlactone, or di-epoxy compound can be used in the coupling of two hydroxyl, two amino groups, two carboxyl groups, two epoxy groups, or combination thereof; a diamine or dihydroxyl compound can be used in the coupling of two isocyanate, epoxy, aziridine, carboxylic acid, or azlactone groups or combinations thereof. At a relatively elevated temperature (from about 40° C. to about 140° C.), positively-charged azetidinium groups react with functional groups such as amino groups, thiol groups, and carboxylate ion —COO (i.e., the deprotonated form of a carboxyl group) to form neutral, hydroxyl-containing covalent linkages as illustrated in the scheme I Scheme I

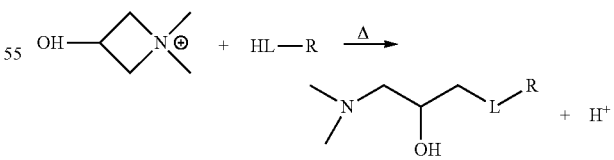

in which R is the rest portion of a compound, L is —NR'— in which R' is hydrogen, a C$_1$-C$_{20}$ unsubstituted or substituted, linear or branched alkyl group, —S—, or —OC(═O)—.

In accordance with the invention, the water-soluble and crosslinkable hydrophilic polymeric material preferably comprises, as the second reactive functional groups, thermally-crosslinkable groups, more preferably azetidinium groups and/or epoxy groups, even more preferably azetidinium groups. Preferably, the water-soluble and crosslinkable hydrophilic polymeric material is a partially-crosslinked hydrophilic polymeric material that comprises a three-dimensional network and crosslinkable (preferably thermally-crosslinkable) groups (such as, e.g., azetidinium and/or epoxy groups), more preferably azetidinium groups within the network. The term "partially-crosslinked" in reference to a hydrophilic polymeric material means that the crosslinkable groups of starting materials for making the hydrophilic polymeric material in a crosslinking reaction have not been fully consumed.

In a preferred embodiment, the water-soluble and crosslinkable hydrophilic polymeric material comprises (i) from about 20% to about 95%, preferably from about 35% to about 90%, more preferably from about 50% to about 85%, by weight of first polymer chains derived from an epichlorohydrin-functionalized polyamine or polyamidoamine, (ii) from about 5% to about 80%, preferably from about 10% to about 65%, even more preferably from about 15% to about 50%, by weight of hydrophilic moieties or second polymer chains derived from at least one hydrophilicity-enhancing agent having at least one reactive functional group selected from the group consisting of amino group, carboxyl group, thiol group, and combination thereof, wherein the hydrophilic moieties or second polymer chains are covalently attached to the first polymer chains through one or more covalent linkages each formed between one azetitdinium group of the epichlorohydrin-functionalized polyamine or polyamidoamine and one amino, carboxyl or thiol group of the hydrophilicity-enhancing agent, and (iii) azetidinium groups which are parts of the first polymer chains or pendant or terminal groups covalently attached to the first polymer chains. The composition of the hydrophilic polymeric material is determined by the composition (based on the total weight of the reactants) of a reactants mixture used for preparing the thermally-crosslinkable hydrophilic polymeric material according to the crosslinking reactions shown in Scheme I above. For example, if a reactant mixture comprises about 75% by weight of an epichlorohydrin-functionalized polyamine or polyamidoamine and about 25% by weight of at least one hydrophilicity-enhancing agent based on the total weight of the reactants, then the resultant hydrophilic polymeric material comprise about 75% by weight of first polymer chains derived from the epichlorohydrin-functionalized polyamine or polyamidoamine and about 25% by weight of hydrophilic moieties or second polymer chains derived from said at least one hydrophilicity-enhancing agent. The azetidinium groups of the thermally-crosslinkable hydrophilic polymeric material are those azetidinium groups (of the epichlorohydrin-functionalized polyamine or polyamidoamine) which do not participate in crosslinking reactions for preparing the thermally-crosslinkable hydrophilic polymeric material.

With such a water-soluble and crosslinkable hydrophilic polymeric material, the crosslinked hydrophilic coating can be formed by simply heating a contact lens having the prime coating having nano-textures in an aqueous solution of a water-soluble and crosslinkable hydrophilic polymeric material to and at a temperature from about 40° C. to about 140° C. for a period of time sufficient to covalently attach the hydrophilic polymeric material onto the prime coating on the surface of the contact lens through covalent linkages each formed between one azetidinium group of the hydrophilic polymeric material and one of the first reactive functional groups of the polymeric coating material in the prime coating on the surface of the contact lens, thereby forming a crosslinked hydrophilic coating comprising nano-textures on the contact lens.

An epichlorohydrin-functionalized polyamine or polyamidoamine can be obtained by reacting epichlorohydrin with a polyamine polymer or a polymer containing primary or secondary amino groups. For example, a poly(alkylene imines) or a poly(amidoamine) which is a polycondensate derived from a polyamine and a dicarboxylic acid (e.g., adipic acid-diethylenetriamine copolymers) can react with epichlorohydrin to form an epichlorohydrin-functionalized polymer. Similarly, a homopolymer or copolymer of aminoalkyl(meth) acrylate, mono-alkylaminoalkyl(meth)acrylate, aminoalkyl(meth)acrylamide, or mono-alkylaminoalkyl (meth)acrylamide can also react with epichlorohydrin to form an epichlorohydrin-functionalized polyamine. The reaction conditions for epichlorohydrin-functionalization of a polyamine or polyamidoamine polymer are taught in EP1465931 (herein incorporated by reference in its entirety). A preferred epichlorohydrin-functionalized polymer is polyaminoamide-epichlorohydrin (PAE) (or polyamide-polyamine-epichlorohydrin or polyamide-epichlorohydrin), such as, for example, Kymene® or Polycup® resins (epichlorohydrin-functionalized adipic acid-diethylenetriamine copolymers) from Hercules or Polycup® or Servamine® resins from Servo/Delden.

Any suitable hydrophilicity-enhancing agents can be used in the invention so long as they contain at least one amino group, at least one carboxyl group, and/or at least one thiol group.

A preferred class of hydrophilicity-enhancing agents include without limitation: amino-, carboxyl- or thiol-containing monosaccharides (e.g., 3-amino-1,2-propanediol, 1-thiolglycerol, 5-keto-D-gluconic acid, galactosamine, glucosamine, galacturonic acid, gluconic acid, glucosaminic acid, mannosamine, saccharic acid 1,4-lactone, saccharide acid, Ketodeoxynonulosonic acid, N-methyl-D-glucamine, 1-amino-1-deoxy-β-D-galactose, 1-amino-1-deoxysorbitol, 1-methylamino-1-deoxysorbitol, N-aminoethyl gluconamide); amino-, carboxyl -or thiol-containing disaccharides (e.g., chondroitin disaccharide sodium salt, di(β-D-xylopyranosyl)amine, digalacturonic acid, heparin disaccharide, hyaluronic acid disaccharide, Lactobionic acid); and amino-, carboxyl- or thiol-containing oligosaccharides (e.g., carboxymethyl-β-cyclodextrin sodium salt, trigalacturonic acid); and combinations thereof.

Another preferred class of hydrophilicity-enhancing agents is hydrophilic polymers having one or more amino, carboxyl and/or thiol groups. More preferably, the content of the amino, carboxyl and/or thiol groups in a hydrophilic polymer as a hydrophilicity-enhancing agent is less than about 40%, preferably less than about 30%, more preferably less than about 20%, even more preferably less than about 10%, by weight based on the total weight of the hydrophilic polymer.

One preferred class of hydrophilic polymers as hydrophilicity-enhancing agents are amino- or carboxyl-containing polysaccharides, for example, such as, carboxymethylcellulose (having a carboxyl content of about 40% or less, which is estimated based on the composition of repeating units, —[$C_6H_{10-m}O_5(CH_2CO_2H)_m$]— in which m is 1 to 3), carboxyethylcellulose (having a carboxyl content of about 36% or less, which is estimated based on the composition of repeating units, —[$C_6H_{10-m}O_5(C_2H_4CO_2H)_m$]— in which m is 1 to 3) carboxypropylcellulose (having a carboxyl content of about 32% or less, which is estimated based on the composition of repeating units, —[$C_6H_{10-m}O_5(C_3H_6CO_2H)_m$]—, in which m is 1 to 3), hyaluronic acid (having a carboxyl content of about 11%, which is estimated based on the composition of repeating units, —($C_{13}H_{20}O_9NCO_2H$)—), chondroitin sulfate (having a carboxyl content of about 9.8%, which is estimated based on the composition of repeating units, —($C_{12}H_{18}O_{13}NS\ CO_2H$)—), or combinations thereof.

Another preferred class of hydrophilic polymers as hydrophilicity-enhancing agents include without limitation: poly (ethylene glycol) (PEG) with mono-amino, carboxyl or thiol group (e.g., PEG-$NH_2$, PEG-SH, PEG-COOH); $H_2N$-PEG-$NH_2$; HOOC-PEG-COOH; HS-PEG-SH; $H_2N$-PEG-COOH; HOOC-PEG-SH; $H_2N$-PEG-SH; multi-arm PEG with one or more amino, carboxyl or thiol groups; PEG dendrimers with one or more amino, carboxyl or thiol groups; a diamino- or dicarboxyl-terminated homo- or co-polymer of a non-reactive hydrophilic vinylic monomer; a monoamino- or monocarboxyl-terminated homo- or co-polymer of a non-reactive hydrophilic vinylic monomer; a copolymer which is a polymerization product of a composition comprising (1) about 60% by weight or less, preferably from about 0.1% to about 30%, more preferably from about 0.5% to about 20%, even more preferably from about 1% to about 15%, by weight of one or more reactive vinylic monomers and (2) at least one non-reactive hydrophilic vinylic monomer; and combinations thereof. Reactive vinylic monomer(s) and non-reactive hydrophilic vinylic monomer(s) are those described previously.

More preferably, a hydrophilic polymer as a hydrophilicity-enhancing agent is PEG-$NH_2$; PEG-SH; PEG-COOH; $H_2N$-PEG-$NH_2$; HOOC-PEG-COOH; HS-PEG-SH; $H_2N$-PEG-COOH; HOOC-PEG-SH; $H_2N$-PEG-SH; multi-arm PEG with one or more amino, carboxyl or thiol groups; PEG dendrimers with one or more amino, carboxyl or thiol groups; a monoamino-, monocarboxyl-, diamino- or dicarboxyl-terminated homo- or copolymer of a non-reactive hydrophilic vinylic monomer selected from the group consisting of acryamide (AAm), N,N-dimethylacrylamide (DMA), N-vinylpyrrolidone (NVP), N-vinyl-N-methyl acetamide, glycerol (meth)acrylate, hydroxyethyl(meth)acrylate, N-hydroxyethyl(meth)acrylamide, $C_1$-$C_4$alkoxy polyethylene glycol (meth)acrylate having a weight average molecular weight of up to 400 Daltons, vinyl alcohol, N-methyl-3-methylene-2-pyrrolidone, 1-methyl-5-methylene-2-pyrrolidone, 5-methyl-3-methylene-2-pyrrolidone, N,N-dimethylaminoethyl (meth)acrylate, N,N-dimethylaminopropyl (metha) crylamide, (meth)acryloyloxyethyl phosphorylcholine, and combinations thereof; a copolymer which is a polymerization product of a composition comprising (1) from about 0.1% to about 30%, preferably from about 0.5% to about 20%, more preferably from about 1% to about 15%, by weight of (meth) acrylic acid, allylamine and/or amino-$C_2$-$C_4$ alkyl(meth) acrylate, and (2) at least one non-reactive hydrophilic vinylic monomer selected from the group consisting of acryamide, N,N-dimethylacrylamide, N-vinylpyrrolidone, (meth)acryloyloxyethyl phosphorylcholine, N-vinyl-N-methyl acetamide, glycerol (meth)acrylate, hydroxyethyl(meth)acrylate, N-hydroxyethyl(meth)acrylamide, $C_1$-$C_4$-alkoxy polyethylene glycol (meth)acrylate having a weight average molecular weight of up to 400 Daltons, vinyl alcohol, and combination thereof.

Most preferably, the hydrophilicity-enhancing agent as a hydrophilicity-enhancing agent is PEG-$NH_2$; PEG-SH; PEG-COOH; monoamino-, monocarboxyl-, diamino- or dicarboxyl-terminated polyvinylpyrrolidone; monoamino-, monocarboxyl-, diamino- or dicarboxyl-terminated polyacrylamide; monoamino-, monocarboxyl-, diamino- or dicarboxyl-terminated poly(DMA); monoamino- or monocarboxyl-, diamino- or dicarboxyl-terminated poly(DMA-co-NVP); monoamino-, monocarboxyl-, diamino- or dicarboxyl-terminated poly(NVP-co-N,N-dimethylaminoethyl (meth)acrylate)); monoamino-, monocarboxyl-, diamino- or dicarboxyl-terminated poly(vinylalcohol); monoamino-, monocarboxyl-, diamino- or dicarboxyl-terminated poly [(meth)acryloyloxyethyl phosphrylcholine]homopolymer or copolymer; monoamino-, monocarboxyl-, diamino- or dicarboxyl-terminated poly(NVP-co-vinyl alcohol); monoamino-, monocarboxyl-, diamino- or dicarboxyl-terminated poly(DMA-co-vinyl alcohol); poly[(meth)acrylic acid-co-acrylamide] with from about 0.1% to about 30%, preferably from about 0.5% to about 20%, more preferably from about 1% to about 15%, by weight of (meth)acrylic acid; poly[(meth)acrylic acid-co-NVP) with from about 0.1% to about 30%, preferably from about 0.5% to about 20%, more preferably from about 1% to about 15%, by weight of (meth) acrylic acid; a copolymer which is a polymerization product of a composition comprising (1) (meth)acryloyloxyethyl phosphorylcholine and (2) from about 0.1% to about 30%, preferably from about 0.5% to about 20%, more preferably from about 1% to about 15%, by weight of (meth)acrylic acid, allylamine and/or amino-$C_2$-$C_4$alkyl(meth)acrylate; and combination thereof.

PEGs with functional groups and multi-arm PEGs with functional groups can be obtained from various commercial suppliers, e.g., Polyscience, and Shearwater Polymers, inc., etc.

Monoamino-, monocarboxyl-, diamino- or dicarboxyl-terminated homo- or copolymers of one or more non-reactive hydrophilic vinylic monomers or of a phosphorylcholine-containing vinylic monomer can be prepared according to procedures described in U.S. Pat. No. 6,218,508, herein incorporated by reference in its entirety. For example, to prepare a diamino- or dicarboxyl-terminated homo- or co-polymer of a non-reactive hydrophilic vinylic monomer, the non-reactive vinylic monomer, a chain transfer agent with an amino or carboxyl group (e.g., 2-aminoethanethiol, 2-mercaptopropinic acid, thioglycolic acid, thiolactic acid, or other hydroxymercaptanes, aminomercaptans, or carboxyl-containing mercaptanes) and optionally other vinylic monomer are copolymerized (thermally or actinically) with a reactive vinylic monomer (having an amino or carboxyl group), in the presence of an free-radical initiator. Generally, the molar ratio of chain transfer agent to that of all of vinylic monomers other than the reactive vinylic monomer is from about 1:5 to about 1:100, whereas the molar ratio of chain transfer agent to the reactive vinylic monomer is 1:1. In such preparation, the chain transfer agent with amino or carboxyl group is used to control the molecular weight of the resultant hydrophilic polymer and forms a terminal end of the resultant hydrophilic polymer so as to provide the resultant hydrophilic polymer with one terminal amino or carboxyl group, while the reactive vinylic monomer provides the other terminal carboxyl or amino group to the resultant hydrophilic polymer. Similarly, to prepare a monoamino- or monocarboxyl-terminated homo- or co-polymer of a non-reactive hydrophilic vinylic monomer, the non-reactive vinylic monomer, a chain transfer agent with an amino or carboxyl group (e.g., 2-aminoethanethiol, 2-mercaptopropinic acid, thioglycolic acid, thiolactic acid, or other hydroxymercaptanes, aminomercaptans, or carboxyl-containing mercaptanes) and optionally other vinylic monomers are copolymerized (thermally or actinically) in the absence of any reactive vinylic monomer.

Copolymers containing monomeric units derived from methacryloyloxyethyl phosphorylcholine and carboxyl, amino and/or thiol reactive functional groups can be obtained from NOP Corporation (e.g., LIPIDURE®-A and -AF).

The weight average molecular weight $M_w$ of the hydrophilic polymer having at least one amino, carboxyl or thiol group (as a hydrophilicity-enhancing agent) as hydrophilicity-enhancing agent is preferably from about 500 to about 1,000,000, more preferably from about 1,000 to about 500,000, even more preferably from about 5,000 to about 250,000 Daltons.

It is understood that the reaction between a hydrophilicity-enhancing agent and an epichlorohydrin-functionalized polyamine or polyamidoamine is carried out at a temperature of from about 40° C. to about 100° C. for a period of time sufficient (from about 0.3 hour to about 24 hours, preferably from about 1 hour to about 12 hours, even more preferably from about 2 hours to about 8 hours) to form a water-soluble and thermally-crosslinkable hydrophilic polymeric material containing azetidinium groups.

It is also understood that the concentration of a hydrophilicity-enhancing agent relative to an epichlorohydrin-functionalized polyamine or polyamidoamine must be selected not to render a resultant hydrophilic polymeric material water-insoluble (i.e., a solubility of less than 0.005 g per 100 ml of water at room temperature) and not to consume more than about 99%, preferably about 98%, more preferably about 97%, even more preferably about 96% of the azetidinium groups of the epichlorohydrin-functionalized polyamine or polyamidoamine.

In accordance with the invention, heating for forming a crosslinked hydrophilic coating is performed preferably by autoclaving a contact lens, preferably a SiHy contact lens that comprises a prime coating including nano-textures and is immersed in a packaging solution (i.e., a buffered aqueous solution) including a water-soluble thermally crosslinkable hydrophilic polymeric material in a sealed lens package at a temperature of from about 118° C. to about 125° C. for approximately 20-90 minutes. In accordance with this embodiment of the invention, the packaging solution is a buffered aqueous solution which is ophthalmically safe after autoclave. Alternatively, is performed preferably by autoclaving a SiHy contact lens, which comprises a base coating and a layer of a water-soluble thermally crosslinkable hydrophilic polymeric material on top of the base coating, immersed in a packaging solution (i.e., a buffered aqueous solution) in a sealed lens package at a temperature of from about 118° C. to about 125° C. for approximately 20-90 minutes.

Lens packages (or containers) are well known to a person skilled in the art for autoclaving and storing a soft contact lens. Any lens packages can be used in the invention. Preferably, a lens package is a blister package which comprises a base and a cover, wherein the cover is detachably sealed to the base, wherein the base includes a cavity for receiving a sterile packaging solution and the contact lens.

Lenses are packaged in individual packages, sealed, and sterilized (e.g., by autoclave at about 120° C. or higher for at least 30 minutes) prior to dispensing to users. A person skilled in the art will understand well how to seal and sterilize lens packages.

In accordance with the invention, a packaging solution contains at least one buffering agent and one or more other ingredients known to a person skilled in the art. Examples of other ingredients include without limitation, tonicity agents, surfactants, antibacterial agents, preservatives, and lubricants (or water-soluble viscosity builders) (e.g., cellulose derivatives, polyvinyl alcohol, polyvinyl pyrrolidone).

The packaging solution contains a buffering agent in an amount sufficient to maintain a pH of the packaging solution in the desired range, for example, preferably in a physiologically acceptable range of about 6 to about 8.5. Any known, physiologically compatible buffering agents can be used. Suitable buffering agents as a constituent of the contact lens care composition according to the invention are known to the person skilled in the art. Examples are boric acid, borates, e.g. sodium borate, citric acid, citrates, e.g. potassium citrate, bicarbonates, e.g. sodium bicarbonate, TRIS (2-amino-2-hydroxymethyl-1,3-propanediol), Bis-Tris (Bis-(2-hydroxyethyl)-imino-tris-(hydroxymethyl)-methane), bis-aminopolyols, triethanolamine, ACES (N-(2-hydroxyethyl)-2-aminoethanesulfonic acid), BES (N,N-Bis(2-hydroxyethyl)-2-aminoethanesulfonic acid), HEPES (4-(2-hydroxyethyl)-1-piperazineethanesulfonic acid), MES (2-(N-morpholino) ethanesulfonic acid), MOPS (3-[N-morpholino]-propanesulfonic acid), PIPES (piperazine-N,N'-bis(2-ethanesulfonic acid), TES (N-[Tris(hydroxymethyl)methyl]-2-aminoethanesulfonic acid), salts thereof, phosphate buffers, e.g. $Na_2HPO_4$, $NaH_2PO_4$, and $KH_2PO_4$ or mixtures thereof. A preferred bis-aminopolyol is 1,3-bis(tris[hydroxymethyl]-methylamino)propane (bis-TRIS-propane). The amount of each buffer agent in a packaging solution is preferably from 0.001% to 2%, preferably from 0.01% to 1%; most preferably from about 0.05% to about 0.30% by weight.

The packaging solution has a tonicity of from about 200 to about 450 milliosmol (mOsm), preferably from about 250 to about 350 mOsm. The tonicity of a packaging solution can be adjusted by adding organic or inorganic substances which affect the tonicity. Suitable occularly acceptable tonicity agents include, but are not limited to sodium chloride, potassium chloride, glycerol, propylene glycol, polyols, mannitols, sorbitol, xylitol and mixtures thereof.

A packaging solution of the invention has a viscosity of from about 1 centipoise to about 10 centipoises, preferably from about 1 centipoise to about 5 centipoises, more preferably from about 1.2 centipoises to about 2.5 centipoises, at 25° C.

In a preferred embodiment, the packaging solution comprises preferably from about 0.01% to about 2%, more preferably from about 0.05% to about 1.5%, even more preferably from about 0.1% to about 1%, most preferably from about 0.2% to about 0.5%, by weight of a water-soluble and thermally-crosslinkable hydrophilic polymeric material of the invention.

A packaging solution of the invention can contain a viscosity-enhancing polymer, a surfactant, and/or other components known to a person skilled in the art.

It should be understood that although in this aspect of the invention various embodiments including preferred embodiments of the invention may be separately described above, they can be combined and/or used together in any desirable fashion to arrive at different embodiments of a silicone hydrogel contact lenses of the invention.

In another aspect, the invention provides a silicone hdyrogel (SiHy) contact comprising a silicone hydrogel lens body and a non-silicone hydrogel coating thereon, wherein the coating comprises winkle surface patterns (nano-textures) having a roughness (i.e., an arithmetical mean roughness, Ra) of from about 5 nm to about 600 nm, preferably from about 10 nm to about 400 nm, even more preferably from about 15 nm to about 200 nm, even more preferably from about 20 nm to about 100 nm. In a preferred embodiment, a SiHy contact lens of the invention has at least one of properties selected from the group consisting of (1) a surface hydrophilicity/wettability characterized by having an averaged water contact angle of preferably about 90 degrees or less, more preferably about 80 degrees or less, even more preferably about 70 degrees or less, most preferably about 60 degrees or less; (2) an oxygen transmissibility of at least about 50, preferably at least about 70, more preferably at least about 80, even more preferably at least about 90 barrers/mm; (3) an elastic modulus of about 1.5 MPa or less, preferably about 1.2 MPa or less, more preferably about 1.0 or less, even more preferably from about 0.3 MPa to about 1.0 MPa; (4) a water content of preferably from about 18% to about 70%, more preferably from about 20% to about 60% by weight when fully hydrated; and (5) combinations thereof. The water content of a silicone hydrogel contact lens can be measured according to Bulk Technique as disclosed in U.S. Pat. No. 5,849,811.

It should be understood that although in this aspect of the invention various embodiments including preferred embodiments of the invention may be separately described above, they can be combined and/or used together in any desirable fashion to arrive at different embodiments of a silicone hydrogel contact lenses of the invention. All of the various embodiments described above for the previous aspect of the invention can be used alone or in combination in any desirable fashion in this aspect of the invention.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together. Therefore, the spirit and scope of the appended claims should not be limited to the description of the preferred versions contained therein.

EXAMPLE 1

Oxygen Permeability Measurements

The apparent oxygen permeability of a lens and oxygen transmissibility of a lens material is determined according to a technique similar to the one described in U.S. Pat. No. 5,760,100 and in an article by Winterton et al., (The Cornea: Transactions of the World Congress on the Cornea 111, H. D. Cavanagh Ed., Raven Press: New York 1988, pp 273-280), both of which are herein incorporated by reference in their entireties. Oxygen fluxes (J) are measured at 34° C. in a wet cell (i.e., gas streams are maintained at about 100% relative humidity) using a Dk1000 instrument (available from Applied Design and Development Co., Norcross, Ga.), or similar analytical instrument. An air stream, having a known percentage of oxygen (e.g., 21%), is passed across one side of the lens at a rate of about 10 to 20 cm³/min., while a nitrogen stream is passed on the opposite side of the lens at a rate of about 10 to 20 cm³/min. A sample is equilibrated in a test media (i.e., saline or distilled water) at the prescribed test temperature for at least 30 minutes prior to measurement but not more than 45 minutes. Any test media used as the overlayer is equilibrated at the prescribed test temperature for at least 30 minutes prior to measurement but not more than 45 minutes. The stir motor's speed is set to 1200±50 rpm, corresponding to an indicated setting of 400±15 on the stepper motor controller. The barometric pressure surrounding the system, $P_{measured}$, is measured. The thickness (t) of the lens in the area being exposed for testing is determined by measuring about 10 locations with a Mitotoya micrometer VL-50, or similar instrument, and averaging the measurements. The oxygen concentration in the nitrogen stream (i.e., oxygen which diffuses through the lens) is measured using the DK1000 instrument. The apparent oxygen permeability of the lens material, $Dk_{app}$, is determined from the following formula:

$$Dk_{app} = Jt/(P_{oxygen})$$

where J=oxygen flux [microliters $O_2/cm^2$-minute]
$P_{oxygen}=(P_{measured}-P_{water}\text{ vapor})=(\%O_2 \text{ in air stream})$[mm Hg]=partial pressure of oxygen in the air stream
$P_{measured}$=barometric pressure (mm Hg)
$P_{water}$ vapor=0 mm Hg at 34° C. (in a dry cell) (mm Hg)
$P_{water}$ vapor=40 mm Hg at 34° C. (in a wet cell) (mm Hg)
t=average thickness of the lens over the exposed test area (mm)
$Dk_{app}$ is expressed in units of barrers.

The apparent oxygen transmissibility (Dk/t) of the material may be calculated by dividing the apparent oxygen permeability ($Dk_{app}$) by the average thickness (t) of the lens.

The above described measurements are not corrected for the so-called boundary layer effect which is attributable to the use of a water or saline bath on top of the contact lens during the oxygen flux measurement. The boundary layer effect causes the reported value for the apparent Dk of a silicone hydrogel material to be lower than the actual intrinsic Dk value. Further, the relative impact of the boundary layer effect is greater for thinner lenses than with thicker lenses. The net effect is that the reported Dk appear to change as a function of lens thickness when it should remain constant.

The intrinsic Dk value of a lens can be estimated based on a Dk value corrected for the surface resistance to oxygen flux caused by the boundary layer effect as follows.

Measure the apparent oxygen permeability values (single point) of the reference lotrafilcon A (Focus® N&D® from CIBA VISION CORPORATION) or lotrafilcon B (AirOptix™ from CIBA VISION CORPORATION) lenses using the same equipment. The reference lenses are of similar optical power as the test lenses and are measured concurrently with the test lenses.

Measure the oxygen flux through a thickness series of lotrafilcon A or lotrafilcon B (reference) lenses using the same equipment according to the procedure for apparent Dk measurements described above, to obtain the intrinsic Dk value ($Dk_i$) of the reference lens. A thickness series should cover a thickness range of approximately 100 μm or more. Preferably, the range of reference lens thicknesses will bracket the test lens thicknesses. The $Dk_{app}$ of these reference lenses must be measured on the same equipment as the test lenses and should ideally be measured contemporaneously with the test lenses. The equipment setup and measurement parameters should be held constant throughout the experiment. The individual samples may be measured multiple times if desired.

Determine the residual oxygen resistance value, $R_r$, from the reference lens results using equation 1 in the calculations.

$$R_r = \frac{\sum\left(\frac{t}{Dk_{app}} - \frac{t}{Dk_i}\right)}{n} \qquad (1)$$

in which t is the thickness of the test lens (i.e., the reference lens too), and n is the number of the reference lenses measured. Plot the residual oxygen resistance value, $R_r$, vs. t data and fit a curve of the form Y=a+bX where, for the jth lens, $Y_j=(\Delta P/J)_j$ and $X=t_j$. The residual oxygen resistance, $R_r$ is equal to a.

Use the residual oxygen resistance value determined above to calculate the correct oxygen permeability $Dk_c$ (estimated intrinsic Dk) for the test lenses based on Equation 2.

$$Dk_c = t/[(t/Dk_a) - R_r] \quad (2)$$

The estimated intrinsic Dk of the test lens can be used to calculate what the apparent Dk ($Dk_{a\_std}$) would have been for a standard thickness lens in the same test environment based on Equation 3. The standard thickness ($t_{std}$) for lotrafilcon A=85 μm. The standard thickness for lotrafilcon B=60 μm.

$$Dk_{a\_std} = t_{std}/[(t_{std}/Dk_c) + R_{r\_std}] \quad (3)$$

Surface hydrophilicity/wettability Tests. Water contact angle on a contact lens is a general measure of the surface hydrophilicity (or wettability) of the contact lens. In particular, a low water contact angle corresponds to more hydrophilic surface. Average contact angles (Sessile Drop) of contact lenses are measured using a VCA 2500 XE contact angle measurement device from AST, Inc., located in Boston, Mass. This equipment is capable of measuring advancing or receding contact angles or sessile (static) contact angles. The measurements are performed on fully hydrated contact lenses and immediately after blot-drying as follows. A contact lens is removed from the vial and washed 3 times in ~200 ml of fresh DI water in order to remove loosely bound packaging additives from the lens surface. The lens is then placed on top of a lint-free clean cloth (Alpha Wipe TX1009), dabbed well to remove surface water, mounted on the contact angle measurement pedestal, blown dry with a blast of dry air and finally the sessile drop contact angle is automatically measured using the software provided by the manufacturer. The DI water used for measuring the contact angle has a resistivity >18 MΩcm and the droplet volume used is 2 μl. Typically, uncoated silicone hydrogel lenses (after autoclave) have a sessile drop contact angle around 120 degrees. The tweezers and the pedestal are washed well with Isopropanol and rinsed with DI water before coming in contact with the contact lenses.

Coating Intactness Tests. The intactness of a coating on the surface of a contact lens can be tested according to Sudan Black stain test as follow. Contact lenses with a coating (an LbL coating, a plasma coating, or any other coatings) are dipped into a Sudan Black dye solution (Sudan Black in vitamin E oil) and then rinsed extensively in water. Sudan Black dye is hydrophobic and has a great tendency to be adsorbed by a hydrophobic material or onto a hydrophobic lens surface or hydrophobic spots on a partially coated surface of a hydrophobic lens (e.g., silicone hydrogel contact lens). If the coating on a hydrophobic lens is intact, no staining spots should be observed on or in the lens. All of the lenses under test are fully hydrated.

Tests of Coating Durability. The lenses are digitally rubbed with Solo-care® multi-purpose lens care solution for 30 times and then rinsed with saline. The above procedure is repeated for a given times, e.g., from 1 to 30 times, (i.e., number of consecutive digital rubbing tests which imitate cleaning and soaking cycles). The lenses are then subjected to Sudan Black test (i.e., coating intactness test described above) to examine whether the coating is still intact. To survive digital rubbing test, there is no significantly increased staining spots (e.g., staining spots covering no more than about 5% of the total lens surface). Water contact angles are measured to determine the coating durability.

Determination of Azetidinium Content. The azetidinium content in PAE can be determined according to one of the following assays.

PPVS Assays. PAE charge density (i.e., azetidinium content) can be determined according to PPVS assay, a colorimetric titration assay where the titrant is potassium vinyl sulfate (PPVS) and Toluidine Blue is the indicator. See, S-K Kam and J. Gregory, "Charge determination of synthetic cationic polyelectrolytes by colloid titration," in Colloid & Surface A: Physicochem. Eng. Aspect, 159: 165-179 (1999). PPVS binds positively-charged species, e.g., Toluidine Blue and the azetidinium groups of PAE. Decreases in Toluidine Blue absorbance intensities are indicative of proportionate PAE charge density (azetidinium content).

PES-Na Assay. PES-Na assay is another colorimetric titration assay for determining PAE charge density (azetidinium content). In this assay, the titrant is Sodium-polyethylensulphonate (PES-Na) instead of PPVS. The assay is identical to the PPVS assay described above.

PCD Assays. PCD assay is a potentiometric titration assay for determining PAE charge density (azetidinium content). The titrant is Sodium-polyethylensulphonate (PES-Na), PPVS or other titrant. PAE charge is detected by an electrode, for example using the Mütek PCD-04 Particle Charge Detector from BTG. The measuring principle of this detector can be found in BTG's website http://www.btg.com/products.asp?langue=1&appli=5&numProd=357&cat=prod).

NMR Method. The active positively charged moeity in PAE is the azetidinium group (AZR). The NMR ratio method is a ratio of the number of AZR group-specific protons versus the number of non-AZR related protons. This ratio is an indicator of the charge or AZR density for PAE.

Characterization of the Nano-textured Surfaces of Contact Lens

Transmission-Differential-Interference-Contrast (TDIC) Method. Contact lenses are placed on a glass slide and flattened by compressing the lens between the slide and a glass cover slip. Contact lens surfaces are located and examined by focusing through the lens using a Nikon ME600 microscope with transmission differential interference contrast optics using a 40× objective lens. The obtained TDIC images are then evaluated to determine the presence of winkled surface patterns as shown in FIG. 1.

Figure 2:
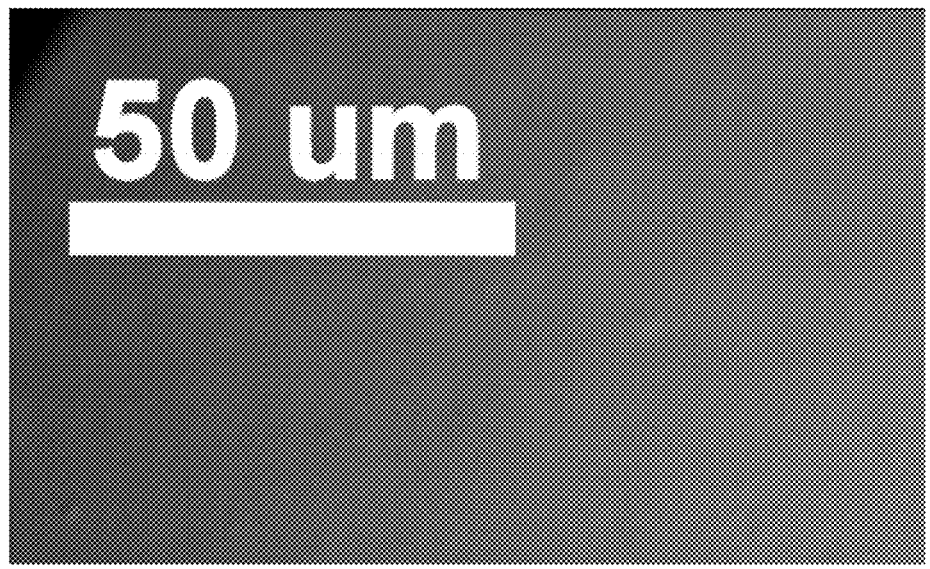
FIG. 2 shows the reflection-differential-interference-contrast (RDIC) images of (A) a SiHy contact lens without nano-textured surfaces and (B) s SiHy contact lens with nano-textured surfaces of the invention according to a preferred embodiment. Both SiHy contact lenses are in hydrated states.
Figure 2:
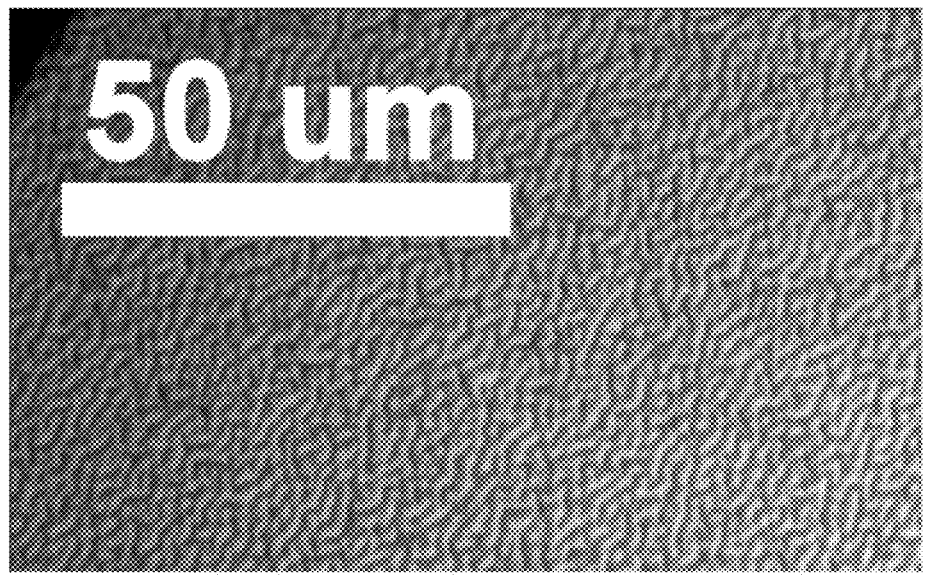

Reflection-Differential-Interference-Contrast (RDIC) Method. Lenses are placed on a glass slide and flattened by making 4 radial cuts every ~90 degrees. Excess saline is blown off the surface using compressed air. Lens surface is then examined using Nikon Optiphot-2 with reflection differential interference contrast optics for the presence of winkled surface patterns on the surfaces of a contact lens using 10×, 20× and 50× objective lenses. A representative image of each side is acquired using 50× objective lens. The contact lens is then flipped over, excess saline removed and the other side of the contact lens and is inspected in the same way. The obtained RDIC images are then evaluated to determine the presence of winkled surface patterns as shown in FIG. 2.

Dark Field Light Microscopy (DFLM). DFLM is generally based on dark field illumination which is a method of enhancing contrast in observed samples. This technique consists of a light source outside or blocked from the observer's field of view in order to illuminate a sample at an angle relative to normal transmitted light. Since the un-scattered light from the source is not gathered by the objective lens, it is not part of the image and the background of the image appears dark. Since the light source is illuminating the sample at an angle, the light observed in the sample image is that which is scatted by the sample toward the observer, contrast is then created between this scattered light from the sample and the dark background of the image. This contrast mechanism makes dark illumination especially useful for the observation of scattered phenomena such as haze.

DFLM is used to evaluate the haziness of contact lenses as follows. It is believed that since the dark-field setup involves scattered light, dark-field data could provide the worst-case estimate of haziness. In 8-bit grey scale digital images each image pixel is assigned a grey scale intensity (GSI) value in the range from 0-255. Zero represents a pixel that is perfectly black and 255 represents a pixel that is perfectly white. An increase in the scattered light captured in the image will produce pixels with higher GSI values. This GSI value can then be used as a mechanism to quantify the amount of scattered light observed in a dark field image. The haziness is expressed by averaging the GSI values of all pixels in an area of interest (AOI) (e.g., a whole lens or the lenticular zone or optical zone of a lens). The experimental set-up consists of a microscope or equivalent optics, an attached digital camera and a dark field stand with ring light and variable intensity light source. Optics is designed/arranged so that the entirety of the contact lens to be observed fills the field of view (typically ~15 mm×20 mm field of view). Illumination is set to a level appropriate to observe the desired changes in the relevant samples. Light intensity is adjusted/calibrated to the same level for each set of samples using a density/light scattering standard as known to a person skilled in the art. For example, a standard is composed of two overlapping plastic cover slips (identical and slight or moderately frosted). Such standard consists of areas with three different averaged GSI that include two areas with intermediate grey scale levels and saturated white (edges). The black areas represent the empty dark field. The black and saturated white areas can be used to verify gain and offset (contrast and brightness) settings of camera. The intermediate grey levels can provide three points to verify the linear response of the camera. Light intensity is adjusted so that the average GSI of the empty dark field approaches 0 and that of a defined AOI in a digital image of the standard is the same each time within ±5 GSI units. After light intensity calibration, a contact lens is immersed in 0.2 µm-filtered phosphate buffer saline in a quartz Petri dish or a dish or similar clarity which is placed on the DFLM stand. An 8-bit grey scale digital image of the lens is then acquired as viewed using the calibrated illumination and the average GSI of a defined AOI within the portion of the image containing the lens is determined. This is repeated for a sample set of contact lenses. Light intensity calibration is re-evaluated periodically over the course of a test to ensure consistency.

The level of haziness under DFLM examination refers to a DFLM haziness $$\frac{GSI}{255} \times 100\%.$$

EXAMPLE 2

Preparation of Chain-Extended Polydimethylsiloxane Vinylic Macromer with Terminal Methacrylate Groups (CE-PDMS Macromer)

In the first step, α,ω-bis(2-hydroxyethoxypropyl)-polydimethylsiloxane (Mn=2000, Shin-Etsu, KF-6001a) is capped with isophorone diisocyanate (IPDI) by reacting 49.85 g of α,ω-bis(2-hydroxyethoxypropyl)-polydimethylsiloxane with 11.1 g IPDI in 150 g of dry methyl ethyl ketone (MEK) in the presence of 0.063 g of dibutyltindilaurate (DBTDL). The reaction is kept for 4.5 h at 40° C., forming IPDI-PDMS-IPDI. In the second step, a mixture of 164.8 g of α,ω-bis(2-hydroxyethoxypropyl)-polydimethylsiloxane (Mn=3000, Shin-Etsu, KF-6002) and 50 g of dry MEK are added dropwise to the IPDI-PDMS-IPDI solution to which has been added an additional 0.063 g of DBTDL. The reactor is held for 4.5 h at about 40° C., forming HO-PDMS-IPDI-PDMS-IPDI-PDMS-OH. MEK is then removed under reduced pressure. In the third step, the terminal hydroxyl-groups are capped with methacryloyloxyethyl groups in a third step by addition of 7.77 g of isocyanatoethylmethacrylate (IEM) and an additional 0.063 g of DBTDL, forming IEM-PDMS-IPDI-PDMS-IPDI-PDMS-IEM.

Alternate Preparation of CE-PDMS Macromer with Terminal Methacrylate Groups 240.43 g of KF-6001 is added into a 1-L reactor equipped with stirring, thermometer, cryostat, dropping funnel, and nitrogen/vacuum inlet adapter, and then dried by application of high vacuum ($2\times10^{-2}$ mBar). Then, under an atmosphere of dry nitrogen, 320 g of distilled MEK is then added into the reactor and the mixture is stirred thoroughly. 0.235 g of DBTDL is added to the reactor. After the reactor is warmed to 45° C., 45.86 g of IPDI are added through an addition funnel over 10 minutes to the reactor under moderate stirring. The reaction is kept for 2 hours at 60° C. 630 g of KF-6002 dissolved in 452 g of distilled MEK are then added and stirred until a homogeneous solution is formed. 0.235 g of DBTDL are added, and the reactor is held at about 55° C. overnight under a blanket of dry nitrogen. The next day, MEK is removed by flash distillation. The reactor is cooled and 22.7 g of IEM are then charged to the reactor followed by about 0.235 g of DBTDL. After about 3 hours, an additional 3.3 g of IEM are added and the reaction is allowed to proceed overnight. The following day, the reaction mixture is cooled to about 18° C. to obtain CE-PDMS macromer with terminal methacrylate groups.

EXAMPLE 3

Preparation of Lens Formulations

Formulation I is prepared by dissolving components in 1-propanol to have the following composition: 33% by weight of CE-PDMS macromer prepared in Example 2, 17% by weight of N-[tris(trimethylsiloxy)-silylpropyl]acrylamide (TRIS-Am), 24% by weight of N,N-dimethylacrylamide (DMA), 0.5% by weight of N-(carbonyl-methoxypolyethylene glycol-2000)-1,2-disteaoyl-sn-glycero-3-phosphoethanolamin, sodium salt) (L-PEG), 1.0% by weight Darocur 1173 (DC1173), 0.1% by weight of visitint (5% copper phthalocyanine blue pigment dispersion in tris(trimethylsiloxy)silylpropylmethacrylate, TRIS), and 24.5% by weight of 1-propanol.

Formulation II is prepared by dissolving components in 1-propanol to have the following composition: about 32% by weight of CE-PDMS macromer prepared in Example 2, about 21% by weight of TRIS-Am, about 23% by weight of DMA, about 0.6% by weight of L-PEG, about 1% by weight of DC1173, about 0.1% by weight of visitint (5% copper phthalocyanine blue pigment dispersion in TRIS), about 0.8% by weight of DMPC, about 200 ppm H-tempo, and about 22% by weight of 1-propanol.

Preparation of Lenses

Lenses are prepared by cast-molding from a lens formulation prepared above in a reusable mold (quartz female mold half and glass male mold half), similar to the mold shown in FIGS. 1-6 in U.S. Pat. Nos. 7,384,590 and 7,387,759 (FIGS. 1-6). The UV irradiation source is a Hamamatsu lamp with the WG335+TM297 cut off filter at an intensity of about 4 mW/cm². The lens formulation in the mold is irradiated with UV irradition for about 25 seconds. Cast-molded lenses are extracted with methyl ethyl ketone (MEK) (or propanol or isopropanol).

Application of PAA Prime Coating onto SiHy Contact lenses

A polyacrylic acid coating solution (PAA-1) is prepared by dissolving an amount of PAA (M.W.: 450 kDa, from Lubrizol) in a given volume of 1-propanol to have a concentration of about 0.1% by weight and the pH is adjusted with formic acid to about 2.5.

Another PAA coating solution (PAA-2) is prepared by dissolving an amount of PAA (M.W.: 450 kDa, from Lubrizol) in a given volume of an organic-based solvent (50/50 1-propanol/$H_2O$) to have a concentration of about 0.1% by weight and the pH is adjusted with formic acid to about 2.5.

Above-obtained SiHy contact lenses are subjected to one of dipping processes shown in Tables 1 and 2.

TABLE 1

| | | Dipping Process | | | | | |
|---|---|---|---|---|---|---|---|
| Baths | Time | 20-0 | 20-1 | 20-2 | 20-3 | 20-4 | 20-5 |
| 1 | 56 s | H2O | H2O | H2O | H2O | H2O | H2O |
| 2 | 44 s | MEK | MEK | MEK | MEK | MEK | MEK |
| 3 | 56 s | MEK | MEK | MEK | MEK | MEK | MEK |
| 4 | 56 s | MEK | MEK | MEK | MEK | MEK | MEK |
| 5 | 56 s | MEK | MEK | MEK | MEK | MEK | MEK |
| 6 | 56 s | MEK | MEK | MEK | MEK | MEK | MEK |
| 7 | 56 s | MEK | MEK | MEK | MEK | MEK | MEK |
| 8 | 56 s | H2O | H2O | H2O | H2O | H2O | H2O |
| 9 | 44 s | PAA-1 | PAA-1 | PAA-1 | PAA-2 | PAA-2 | PAA-1 |
| 10 | 56 s | PAA-1 | PAA-1 | PAA-1 | PAA-2 | PAA-2 | PAA-1 |
| 11 | 56 s | H2O | PrOH | H2O | H2O | H2O | H2O |
| 12 | 44 s | H2O | PrOH | PrOH | PrOH | 50/50 | 50/50 |
| 13 | 56 s | H2O | H2O | H2O | H2O | H2O | H2O |
| 14 | 56 s | H2O | H2O | H2O | H2O | H2O | H2O |
| 15 | 56 s | PBS | PBS | PBS | PBS | PBS | PBS |
| 16 | 56 s | H2O | H2O | H2O | H2O | H2O | H2O |

PrOH represents 100% 1-propanol;
PBS stands for phosphate-buffered saline;
MEK stands for methyl ethyl keton;
50/50 stands a solvent mixture of 50/50 1-PrOH/$H_2O$.

TABLE 2

| | | Dipping Process | | | | | | |
|---|---|---|---|---|---|---|---|---|
| Baths | Time | 80-0 | 80-1 | 80-2 | 80-3 | 80-4 | 80-5 | 80-6 |
| 1 | 56 s | H2O | H2O | H2O | H2O | H2O | H2O | H2O |
| 2 | 44 s | MEK | MEK | MEK | MEK | MEK | MEK | MEK |
| 3 | 56 s | MEK | MEK | MEK | MEK | MEK | MEK | MEK |
| 4 | 56 s | MEK | MEK | MEK | MEK | MEK | MEK | MEK |
| 5 | 56 s | MEK | MEK | MEK | MEK | MEK | MEK | MEK |
| 6 | 56 s | MEK | MEK | MEK | MEK | MEK | MEK | MEK |
| 7 | 56 s | MEK | MEK | MEK | MEK | MEK | MEK | MEK |
| 8 | 56 s | H2O | H2O | H2O | H2O | H2O | H2O | H2O |
| 9 | 44 s | PAA-1 | PAA-1 | PAA-1 | PAA-1 | PAA-1 | PAA-1 | PAA-1 |
| 10 | 56 s | PAA-1 | 50/50 | PrOH | 50/50 | PrOH | PrOH | H2O |
| 11 | 56 s | H2O | H2O | H2O | 50/50 | PrOH | 50/50 | 50/50 |
| 12 | 44 s | H2O | H2O | H2O | H2O | H2O | H2O | H2O |
| 13 | 56 s | H2O | H2O | H2O | H2O | H2O | H2O | H2O |
| 14 | 56 s | H2O | H2O | H2O | H2O | H2O | H2O | H2O |
| 15 | 56 s | PBS | PBS | PBS | PBS | PBS | PBS | PBS |
| 16 | 56 s | H2O | H2O | H2O | H2O | H2O | H2O | H2O |

PrOH represents 100% 1-propanol;
PBS stands for phosphate-buffered saline;
MEK stands for methyl ethyl keton;
50/50 stands a solvent mixture of 50/50 1-PrOH/$H_2O$.

Application of Crosslinked Hydrophilic Coating

Poly(acrylamide-co-acrylic acid) partial sodium salt, Poly(AAm-co-AA)(90/10) (~90% solid content, poly(AAm-co-AA) 90/10, Mw 200,000) is purchased from Polysciences, Inc. and used as received. PAE (Kymene, an azetidinium content of 0.46 assayed with NMR) is purchased from Ashland as an aqueous solution and used as received. An in-package-crosslinking (IPC) saline is prepared by dissolving about 0.07% w/w of poly(AAm-co-AA)(90/10) and about 0.15% of PAE (an initial azetidinium millimolar equivalents of about 8.8 millimole) in phosphate buffered saline (PBS) (about 0.044 w/w % $NaH_2PO_4$—$H_2O$, about 0.388 w/w/% $Na_2HPO_4.2H_2O$, about 0.79 w/w % NaCl) and adjusting the pH to 7.2~7.4. Then the IPC saline is heat pre-treated for about 4 hours at about 70° C. (heat pretreatment). During this heat pretreatment, poly(AAm-co-AA) and PAE are partially crosslinked to each other (i.e., not consuming all azetidinium groups of PAE) to form a water-soluble and thermally-crosslinkable hydrophilic polymeric material containing azetidinium groups within the branched polymer network in the IPC saline. After the heat pre-treatment, the IPC saline is filtered using a 0.22 micron polyether sulphone [PES] membrane filter and cooled down back to room temperature. 10 ppm hydrogen peroxide is then added to the final IPC saline to prevent bioburden growth and the IPC saline is filtered using a 0.22 micron polyether sulphone [PES]membrane filter.

Lenses having a PAA prime coating thereon prepared above are placed in polypropylene lens packaging shells (one lens per shell) with 0.6 mL of the IPC saline (half of the saline is added prior to inserting the lens). The blisters are then sealed with foil and autoclaved for about 30 minutes at about 121° C., forming SiHy contact lenses with crosslinked hydrophilic coatings thereon.

Characterization of SiHy Lenses.

The resultant SiHy contact lense with crosslinked hydrophilic coatings thereon and a center thickness of about 0.95 microns have an oxygen permeability ($Dk_c$ or estimated intrinsic Dk) of about 142 to about 150 barrers, a bulk elastic modulus of about 0.72 to about 0.79 MPa, a water content of about 30% to about 33% by weight, a relative ion permeability of about 6 (relative to Alsacon lens), and a contact angle of from about 34 to about 47 degrees.

SiHy contact lenses, the PAA prime coating of which is obtained according to either of the dipping processes 20-0 and 80-0, are determined to have an averaged DFLM haziness of about 73% and show wrinkle surface patterns (FIGS. 1B and 2B) that can be visually observed by examining the contact lens in hydrated state, according to the method of either RDIC or TDIC as described in Example 1.

SiHy contact lenses, the PAA prime coating of which is obtained according to either of the dipping processes 20-1 to 20-4, are determined to have a low averaged DFLM haziness of about 26% (probably due to the presence of visitint pigment particles) and show no noticeable wrinkle surface patterns (FIGS. 1A and 2A) when examined under either RDIC or TDIC as described in Example 1.

A high percentage of SiHy contact lenses, the PAA prime coating of which is obtained according to either of the dipping process 20-5, are determined to have a moderate averaged DFLM haziness of about 45% and show slightly noticeable wrinkle surface patterns when examined under either RDIC or TDIC as described in Example 1.

SiHy contact lenses, the PAA prime coating of which is obtained according to either of the dipping processes 80-1, 80-2, 80-3, 80-5 and 80-6, do not show noticeable wrinkle surface patterns when examined under either RDIC or TDIC as described in Example 1. But, SiHy contact lenses, the PAA prime coating of which is obtained according to either of the dipping processes 80-0 and 80-4, show noticeable wrinkle surface patterns when examined under either RDIC or TDIC as described in Example 1.

EXAMPLE 4

Fluorescein tagged PAA (PAA-F)

PAA-F is synthesized in-house by covalently attaching 5-aminofluorescein to PAA (Mw 450 k). The labeling degree of fluorescein is a few %, for example, about 2 mole % (or $n/(m+n)=2\%$ in the formula shown below)

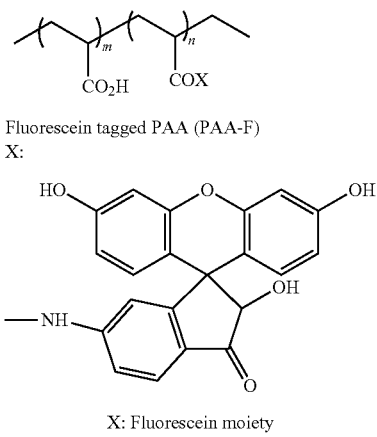

Fluorescein tagged PAA (PAA-F)
X:

X: Fluorescein moiety

Preparation of Lenses.

Lenses are prepared by cast-molding from the lens formulation prepared above in Example 3 in a reusable mold (quartz female mold half and glass male mold half), similar to the mold shown in FIGS. 1-6 in U.S. Pat. Nos. 7,384,590 and 7,387,759 (FIGS. 1-6). The lens formulation in the molds is irradiated with UV irradition (13.0 mW/cm$^2$) for about 24 seconds.

PAA-F Coating Solution.

A PAA-F coating solution is prepared by dissolving an amount of PAA-F prepared above in a given volume of 1-PrOH/water (95/5) solvent mixture to have a concentration of about 0.036% by weight and the pH is adjusted with formic acid to about 2.5.5% water is used in order to dissolve PAA-F.

PAA-Coated Lenses.

Cast-molded contact lenses are extracted and coated by dipping in the following series of baths: DI water bath (about 56 seconds); 6 MEK baths (about 44, 56, 56, 56, 56, and 56 second respectively); DI water bath (about 56 seconds); one bath of PAA-F coating solution (about 0.036% by weight, acidified with formic acid to about pH 2.5) in 1-PrOH/water (95/5) solvent mixture (about 44 seconds); one bath of a water/1-propanol 50%/50% mixture (about 56 seconds); 4 DI water baths each for about 56 seconds; one PBS bath for about 56 seconds; and one DI water bath for about 56 seconds.

Application of Crosslinked Hydrophilic Coating.

Lenses having a PAA-LbL base coating thereon prepared above are placed in polypropylene lens packaging shells (one lens per shell) with 0.6 mL of the IPC saline prepared according to the procedures described in Example 3 (half of the saline is added prior to inserting the lens). The blisters are then sealed with foil and autoclaved for about 30 minutes at about 121° C., forming SiHy contact lenses with crosslinked coatings (PAA-x-hydrophilic polymeric material) thereon.

Con-focal Laser Fluorescent Microscopy.

A cross section of a hydrated SiHy lens with crosslinked coating (prepared above) is cut and placed between two glass cover slips and the image is collected on a con-focal laser fluorescent microscope (model # Zeiss LSM 510 Vis). It is scanned from the front curve side of the lens to the base curve side of the lens, or vice versa. The presence of PAA-F is shown by the green fluorescence and con-focal laser fluorescence microscopic images can be obtained. The examination of the con-focal laser fluorescence microscopic images reveals that the PAA-F rich layer is present on both lens surfaces (anterior and posterior surfaces) and at the peripheral edge, while no PAA-F is observed in the bulk material of the hydrated lens.

Figure 3:
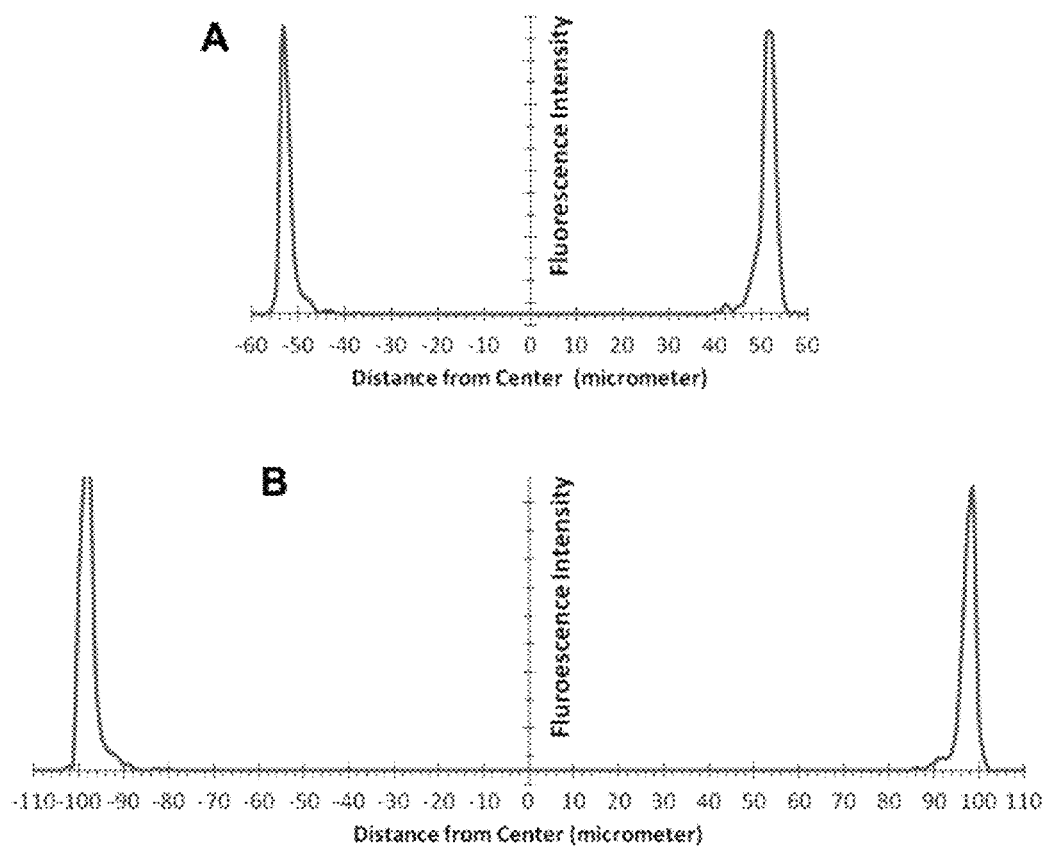
FIG. 3 shows the fluorescence intensity profiles across the cross sections of a SiHy contact lens in a con-focal laser fluorescence microscopy.

The fluorescence intensity profiles are examined across the lens cross section along a line passing through both the posterior and anterior surfaces and normal to the posterior surface. FIG. 3 shows two representative the fluorescence intensity profiles along two lines across the lens cross section, one at the point where the lens thickness is about 100 μm (panel A) and the other at the point where the lens thickness is about 200 μm (panel B). The original points in FIG. 3 are the center points between the anterior and posterior surfaces along the lines. It can be noticed in FIG. 3 that there is a PAA-F-rich layer near the outermost surfaces of the SiHy lens with crosslinked coating, no PAA-F is present at the bulk of the lens, and the coating thickness is similar on these two cross-sections regardless the thickness of the cross-sections.

The thickness of the PAA-F rich layer is estimated from the fluorescence intensity profile shown in FIG. 3 by the distance from zero intensity, after crossing the peak intensity, to zero intensity again. Considering that there are possible contribution from unknown factors (such as scattering) to the fluorescence intensity, the minimum layer thickness is the thickness for which a florescent intensity of at least 10% of the maximum peak intensity is retained. Based on such estimation, the minimum PAA-F-rich layer thickness could be at least about 5 microns.

What is claimed is:

1. A method for making contact lenses having nano-textured surfaces, comprising the steps of:
   (1) providing an organic-based coating solution including an organic-based solvent and a polymeric coating material dissolved in the organic-based solvent, wherein the polymeric coating material comprises multiple first reactive functional groups and multiple affinity groups or moieties, wherein the multiple first reactive functional groups are selected from the group consisting of carboxyl groups, azetidinium groups, amino groups, azlactone groups, isocyanate groups, epoxy groups, aziridine groups, thiol groups, hydroxyl groups, and combinations thereof;

(2) contacting a contact lens with the organic-based coating solution to swell the contact lens and form an intermediary coating of the polymeric coating material on the contact lens, wherein the contact lens comprises, at and near the surface of the contact lens, monomeric units and/or hydrophobic moieties and/or segments capable of interacting with the affinity groups or moieties of the polymeric coating material so as to bind the polymeric coating material, wherein the average molecular weight of the polymeric coating material is selected to be sufficient high to ensure that the polymeric coating material partially penetrate into the contact lens swollen by the organic-based solvent;

(3) contacting the swollen contact lens having the intermediary coating thereon with an aqueous solution or water to shrink the contact lens having the intermediary coating thereon to form a prime coating having nano-textures on the contact lens; and (4) fixing the nano-textures in the prime coating by crosslinking a water-soluble and crosslinkable hydrophilic polymeric material with multiple second functional reactive functional groups onto the prime coating through the first reactive functional groups to form a crosslinked polymeric coating that preserves the nano-textures of the prime coating and provides a nano-textured surface to the contact lens, wherein the multiple second reactive functional groups of the water-soluble and crosslinkable hydrophilic polymeric material are: carboxyl groups, azetidinium groups, amino groups, azlactone groups, isocyanate groups, epoxy groups, aziridine groups, hydroxyl groups, thiol groups, or combinations thereof, wherein one first reactive functional reactive group can react with one second reactive functional group in the presence or absence of a coupling agent to form one crosslinkage between the polymeric coating material and the water-soluble and crosslinkable hydrophilic polymeric material.

2. The method of claim 1, wherein the organic-based solvent is a solvent system which consists of one or more organic solvents and optionally about 30% or less by weight of water relative to the weight of the solvent system, wherein the one or more organic solvents are selected from the group consisting of tripropylene glycol methyl ether, dipropylene glycol methyl ether, ethylene glycol n-butyl ether, acetone, methyl ethyl ketone, diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimetyl ether, polyethylene glycols, polypropylene glycols, ethyl acetate, butyl acetate, amyl acetate, methyl lactate, ethyl lactate, i-propyl lactate, a $C_1$-$C_{12}$ alcohol, 1-methyl-2-pyrrolidone, N,N-dimethylpropionamide, dimethyl formamide, dimethyl acetamide, dimethyl propionamide, N-methyl pyrrolidinone, 1,2-propylene glycol, polyethyleneglycol having a molecular weight of about 200 or less, tetrahydrofuran, methylene chloride, and combinations thereof.

3. The method of claim 2, wherein the contact lens is swollen by the organic-based coating solution by at least about 50%.

4. The method of claim 1, wherein the affinity groups or moieties are either identical to or different from the first reactive functional groups and are selected from the group consisting of carboxyl groups, ammonium groups, hydrophobic moieties, hydrophobic segments, and combinations thereof.

5. The method of claim 4, wherein the polymeric coating material is: (1) a homopolymer of an ammonium-containing vinylic monomer or a carboxyl containing vinylic monomer; (2) a copolymer of one or more ammonium-containing and/or carboxyl-containing vinylic monomers; (3) a copolymer of one or more ammonium-containing and/or carboxyl-containing vinylic monomers with a non-reactive vinylic monomer selected from the group consisting of (meth)acrylamide, N,N-dimethyl (meth)acrylamide, N-vinylpyrrolidone (NVP), N,N-dimethylaminoethyl (meth)acrylate, N,N-dimethylaminopropyl (meth)acrylamide, glycerol methacrylate, 3-acryloylamino-1-propanol, N-hydroxyethyl acrylamide, N-[tris(hydroxymethyl)methyl]-acrylamide, N-methyl -3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 2-hydroxyethyl (meth)acrylate, hydroxypropyl (meth)acrylate, $C_1$, $C_4$-alkoxy polyethylene glycol (meth)acrylate having a weight average molecular weight of up to 1500 Daltons, N-vinyl formamide, N-vinyl acetamide, N-vinyl isopropylamide, N-vinyl-N-methyl acetamide, allyl alcohol, vinyl alcohol (hydrolyzed form of vinyl acetate in the copolymer), a phosphorylcholine-containing vinylic monomer, and combinations thereof and optionally with one or more reactive vinylic monomer having a reactive functional group selected from the group consisting of azetidinium group, azlactone groups, isocyanate groups, epoxy groups, aziridine groups, and combinations thereof; (4) polyethyleneimine (PEI); (5) polyvinylalcohol with pendant primary and/or secondary amino groups; (6) a block copolymer including at least one hydrophobic segments and polymeric segments having reactive functional groups selected from the group consisting of azetidinium groups, azlactone groups, isocyanate groups, epoxy groups, aziridine groups, thiol groups, and combinations thereof; or (7) a combination thereof.

6. The method of claim 4, wherein the polymeric coating material is a polymer or copolymer comprising at least about 70% by mole of monomeric units of one or more carboxyl-containing vinylic monomers, wherein the one or more carboxyl-containing vinylic monomers are selected from the group consisting of acrylic acid, a $C_1$-$C_4$ alkylacrylic acid, N,N-2-acrylamidoglycolic acid, beta methyl-acrylic acid, alpha-phenyl acrylic acid, beta-acryloxy propionic acid, sorbic acid, angelic acid, cinnamic acid, 1-carobxy-4-phenyl butadiene-1,3, itaconic acid, citraconic acid, mesaconic acid, glutaconic acid, aconitic acid, maleic acid, fumaric acid, and combination thereof.

7. The method of claim 6, wherein the polymeric coating material is: a linear or branched polyacrylic acid; a linear or branched polymethacrylic acid; a linear or branched poly (acrylic acid-co-acrylamide) having at least about 70% by mole; a linear or branched poly(methacrylic acid-co-acrylamide) having at least about 70% by mole of methacrylic acid; a linear or branched poly(acrylic acid-co-vinylpyrrolidone) having at least about 70% by mole of acrylic acid; a linear or branched poly(methacrylic acid-co-vinylpyrrolidone) having at least about 70% by mole of methacrylic acid, or combination thereof.

8. The method of claim 4, wherein the contact lens is a silicone hydrogel contact lens obtained by polymerization of a lens formulation comprising at least one components selected from the group consisting of a silicone-containing vinylic monomer, a silicone-containing vinylic macromer, a silicone-containing prepolymer, a hydrophilic vinylic monomer, a hydrophobic vinylic monomer, a crosslinking agent, a free-radical initiator, a hydrophilic vinylic macromer/prepolymer, a UV-absorbing agent, a visibility tinting agent, antimicrobial agents, a bioactive agent, a leachable lubricant, a leachable tear-stabilizing agent, and combination thereof.

9. The method of claim 4, wherein the second reactive functional groups are thermally-crosslinkable groups.

10. The method of claim 4, wherein the water-soluble and crosslinkable hydrophilic polymeric material is a partially-crosslinked hydrophilic polymeric material that comprises a three-dimensional network and the second reactive functional groups within the network.

11. The method of claim 10, wherein the water-soluble and crosslinkable hydrophilic polymeric material comprises: (i) from about 20% to about 95% by weight of first polymer chains derived from an epichlorohydrin-functionalized polyamine or polyamidoamine, (ii) from about 5% to about 80% by weight of hydrophilic moieties or second polymer chains derived from at least one hydrophilicity-enhancing agent having at least one reactive functional group selected from the group consisting of amino group, carboxyl group, thiol group, and combination thereof, wherein the hydrophilic moieties or second polymer chains are covalently attached to the first polymer chains through one or more covalent linkages each formed between one azetidinium group of the epichlorohydrin-functionalized polyamine or polyamidoamine and one amino, carboxyl or thiol group of the hydrophilicity-enhancing agent, and (iii) azetidinium groups which are parts of the first polymer chains or pendant or terminal groups covalently attached to the first polymer chains.

12. The method of claim 11, wherein the hydrophilicity-enhancing agent is: an amino-, carboxyl- or thiol-containing monosaccharide; an amino-, carboxyl- or thiol-containing disaccharide; an amino-, carboxyl- or thiol-containing oligosaccharide; or a combinations thereof.

13. The method of claim 11, wherein the hydrophilicity-enhancing agent is: carboxymethylcellulose having a carboxyl content of about 40% or less which is estimated based on the composition of repeating units, —[$C_6H_{10-m}O_5(CH_2CO_2H)_m$]— in which m is 1 to 3); carboxyethylcellulose having a carboxyl content of about 36% or less which is estimated based on the composition of repeating units, —[$C_6H_{10-m}O_5(C_2H_4CO_2H)_m$]— in which m is 1 to 3; carboxypropylcellulose having a carboxyl content of about 32% or less which is estimated based on the composition of repeating units, —[$C_6H_{10-m}O_5(C_3H_6CO_2H)_m$]—, in which m is 1 to 3; hyaluronic acid having a carboxyl content of about 11% which is estimated based on the composition of repeating units, —($C_{13}H_{20}O_9NCO_2H$)—); chondroitin sulfate having a carboxyl content of about 9.8% which is estimated based on the composition of repeating units, —($C_{12}H_{18}O_{13}NSCO_2H$)—); or a combination thereof.

14. The method of claim 11, wherein the hydrophilicity-enhancing agent is: PEG-NH$_2$; PEG-SH; PEG-COOH; H$_2$N-PEG-NH$_2$; HOOC-PEG-COOH; HS-PEG-SH; H$_2$N-PEG-COOH; HOOC-PEG-SH; H$_2$N-PEG-SH; multi-arm PEG with one or more amino, carboxyl or thiol groups; PEG dendrimers with one or more amino, carboxyl or thiol groups; a monoamino-, monocarboxyl-, diamino- or dicarboxyl-terminated homo- or copolymer of a non-reactive hydrophilic vinylic monomer selected from the group consisting of acryamide (AAm), N,N-dimethylacrylamide (DMA), N-vinylpyrrolidone (NVP), N-vinyl-N-methyl acetamide, glycerol (meth)acrylate, hydroxyethyl (meth)acrylate, N-hydroxyethyl (meth)acrylamide, $C_1$-$C_4$-alkoxy polyethylene glycol (meth)acrylate having a weight average molecular weight of up to 400 Daltons, vinyl alcohol, N-methyl-3-methylene-2-pyrrolidone, 1-methyl-5-methylene-2-pyrrolidone, 5-methyl-3-methylene-2-pyrrolidone, N,N-dimethylaminoethyl (meth)acrylate, N,N-dimethylaminopropyl (metha)crylamide, (meth)acryloyloxyethyl phosphorylcholine, and combinations thereof; a copolymer which is a polymerization product of a composition comprising (1) from about 0.1% to about 30% by weight of (meth)acrylic acid, allylamine and/or amino-$C_2$-$C_4$ alkyl (meth)acrylate, and (2) at least one non-reactive hydrophilic vinylic monomer selected from the group consisting of acryamide, N,N-dimethylacrylamide, N-vinylpyrrolidone, (meth)acryloyloxyethyl phosphorylcholine, N-vinyl-N-methyl acetamide, glycerol (meth)acrylate, hydroxyethyl (meth)acrylate, N-hydroxyethyl (meth)acrylamide, $C_1$-$C_4$-alkoxy polyethylene glycol (meth)acrylate having a weight average molecular weight of up to 400 Daltons, vinyl alcohol, and a combination thereof; or a combination thereof.

15. The method of claim 11, wherein the hydrophilicity-enhancing agent is: PEG-NH$_2$; PEG-SH; PEG-COOH; monoamino-, monocarboxyl-, diamino- or dicarboxyl-terminated polyvinylpyrrolidone; monoamino-, monocarboxyl-, diamino- or dicarboxyl-terminated polyacrylamide; monoamino-, monocarboxyl-, diamino- or dicarboxyl-terminated poly(DMA); monoamino- or monocarboxyl-, diamino- or dicarboxyl-terminated poly(DMA-co-NVP); monoamino-, monocarboxyl-, diamino- or dicarboxyl-terminated poly(NVP-co-N,N-dimethylaminoethyl (meth)acrylate)); monoamino-, monocarboxyl-, diamino- or dicarboxyl-terminated poly(vinylalcohol); monoamino-, monocarboxyl-, diamino- or dicarboxyl-terminated poly[(meth)acryloyloxyethyl phosphrylcholine] homopolymer or copolymer; monoamino-, monocarboxyl-, diamino- or dicarboxyl-terminated poly(NVP-co-vinyl alcohol); monoamino-, monocarboxyl-, diamino- or dicarboxyl-terminated poly(DMA-co-vinyl alcohol); poly[(meth)acrylic acid-co-acrylamide] with from about 0.1% to about 30% by weight of (meth)acrylic acid; poly[(meth)acrylic acid-co-NVP) with from about 0.1% to about 30% by weight of (meth)acrylic acid; a copolymer which is a polymerization product of a composition comprising (1) (meth)acryloyloxyethyl phosphorylcholine and (2) from about 0.1% to about 30% by weight of (meth)acrylic acid, allylamine and/or amino-$C_2$ $C_4$alkyl (meth)acrylate; and combination thereof; or a combination thereof.

16. The method of claim 4, wherein the step of fixing the nano-textures in the prime coating is performed by autoclaving the contact lens that comprises the prime coating including nano-textures and is immersed in a packaging solution including the water-soluble crosslinkable hydrophilic polymeric material in a sealed lens package at a temperature of from about 118° C. to about 125° C. for approximately 2090minutes, wherein the second reactive functional groups of the water-soluble crosslinkabe hydrophilic polymeric material are azetidinium groups and/or epoxy groups.

* * * * *